(12) United States Patent
Hiramoto et al.

(10) Patent No.: US 10,377,886 B2
(45) Date of Patent: Aug. 13, 2019

(54) POLYETHYLENE FOR PIPE AND JOINT, AND MOLDED BODY THEREOF

(71) Applicant: Japan Polyethylene Corporation, Chiyoda-ku (JP)

(72) Inventors: Tomomi Hiramoto, Kanagawa (JP); Tetsurou Fukuda, Mie (JP)

(73) Assignee: Japan Polyethylene Corporation, Chiyoda-ku (JP)

( * ) Notice: Subject to any disclaimer, the term of this patent is extended or adjusted under 35 U.S.C. 154(b) by 0 days.

(21) Appl. No.: 15/561,804

(22) PCT Filed: Mar. 30, 2016

(86) PCT No.: PCT/JP2016/060539
§ 371 (c)(1),
(2) Date: Sep. 26, 2017

(87) PCT Pub. No.: WO2016/159168
PCT Pub. Date: Oct. 6, 2016

(65) Prior Publication Data
US 2018/0112070 A1 Apr. 26, 2018

(30) Foreign Application Priority Data

Mar. 31, 2015 (JP) ................................. 2015-072626

(51) Int. Cl.
| | | |
|---|---|---|
| *C08L 23/06* | (2006.01) | |
| *C08F 10/02* | (2006.01) | |
| *C08L 23/08* | (2006.01) | |
| *F16L 9/12* | (2006.01) | |
| *F16L 47/00* | (2006.01) | |
| *C08F 4/659* | (2006.01) | |

(52) U.S. Cl.
CPC .............. *C08L 23/06* (2013.01); *C08F 10/02* (2013.01); *C08L 23/08* (2013.01); *F16L 9/12* (2013.01); *C08F 4/65912* (2013.01); *C08F 2500/04* (2013.01); *C08F 2500/08* (2013.01); *C08F 2500/12* (2013.01); *C08L 2205/02* (2013.01); *F16L 47/00* (2013.01)

(58) Field of Classification Search
CPC ... F16L 9/12; F16L 47/00; C08F 10/02; C08F 2/005; C08F 210/16; C08F 210/14; C08F 2500/12; C08F 2500/04; C08F 2500/08; C08L 23/06; C08L 23/08; C08L 23/0815; C08L 2205/02; Y02A 30/40; Y02P 20/52
See application file for complete search history.

(56) References Cited

U.S. PATENT DOCUMENTS

| | | | |
|---|---|---|---|
| 6,169,051 B1 | 1/2001 | Mitani et al. | |
| 6,326,493 B1 | 12/2001 | Mitani et al. | |
| 6,841,621 B2 | 1/2005 | Krümpel et al. | |
| 7,037,977 B2 | 5/2006 | Miserque et al. | |
| 8,835,703 B2 | 9/2014 | Morschbacker | |
| 2006/0054513 A1* | 3/2006 | Lequeux et al. | C08F 10/02 206/0.6 |
| 2007/0255033 A1* | 11/2007 | Kipke et al. | C08F 10/02 526/352 |
| 2009/0082523 A1 | 3/2009 | Saito et al. | |
| 2015/0259455 A1* | 9/2015 | Hlavinka et al. | C08F 210/16 526/114 |

FOREIGN PATENT DOCUMENTS

| | | |
|---|---|---|
| CA | 2 017 190 C | 1/2001 |
| CN | 103492431 A | 1/2014 |
| JP | 63-202602 A | 8/1988 |
| JP | 2-269705 A | 11/1990 |
| JP | 3-21607 A | 1/1991 |
| JP | 2002-535339 A | 10/2002 |
| JP | 2004-123995 A | 4/2004 |
| JP | 2004-510023 A | 4/2004 |
| JP | 2004-512410 A | 4/2004 |
| JP | 2004-189869 A | 7/2004 |
| JP | 2007-2235 A | 1/2007 |
| JP | 2008-501828 | 1/2008 |
| JP | 2008-114819 A | 5/2008 |
| JP | 2009-533511 | 9/2009 |
| JP | 2010-511634 A | 4/2010 |
| JP | 2013-227545 A | 11/2013 |

(Continued)

OTHER PUBLICATIONS

International Search Report dated Jun. 28, 2016 in PCT/JP2016/060539 filed Mar. 30, 2016.
Notice of Reasons for Refusal dated Apr. 12, 2019, in corresponding Japanese Patent Application No. 2016-067399 w/English translation.

(Continued)

Primary Examiner — Nathan M Nutter
(74) Attorney, Agent, or Firm — Oblon, McClelland, Maier & Neustadt, L.L.P.

(57) ABSTRACT

A polyethylene for a pipe and a joint of the present invention satisfies the following characteristics (1) to (5): Characteristic (1): a melt flow rate at a temperature of 190° C. and a load of 21.6 kg (HLMFR) is 5 to 20 g/10 minutes, Characteristic (2): a density (D) is 0.954 to 0.960 g/cm$^3$, Characteristic (3): a ratio of weight-average molecular weight (Mw) and number-average molecular weight (Mn) (Mw/Mn) measured by gel permeation chromatography (GPC) is 15 to 27, Characteristic (4): a rupture time at 80° C. and 5 MPa by a full notch creep test (FNCT) is 150 hours or more, and Characteristic (5): a Charpy impact strength (CIS) measured at −20° C. is 8.5 kJ/m$^2$ or more.

10 Claims, No Drawings

(56) References Cited

FOREIGN PATENT DOCUMENTS

| JP | 2014-208770 A | 11/2014 |
|---|---|---|
| JP | 2015-537092 A | 12/2015 |
| WO | WO 2013/146944 A1 | 10/2013 |
| WO | WO 2014/086468 A1 | 6/2014 |

OTHER PUBLICATIONS

Chinese Office Action dated Jun. 26, 2019, in corresponding Chinse Patent Application No. 201680018748.1 (with English-language Translation). (Reference AOIs cited therein).

* cited by examiner

POLYETHYLENE FOR PIPE AND JOINT, AND MOLDED BODY THEREOF

TECHNICAL FIELD

The present invention relates to a polyethylene for a pipe and a joint, and a molded body thereof. More specifically, it relates to a polyethylene for a pipe and a joint, which has high pressure resistance and also excellent long-term durability and is capable of being molded in both methods of an injection molding method and an extrusion molding method, and also has excellent dimensional stability and pipe surface appearance of an injection molded article, particularly in pipe and joint use applications, and a molded body thereof.

BACKGROUND ART

Since a polyethylene resin is excellent in moldability and various physical properties and has high economic efficiency and suitability for environmental issue, the polyethylene resin is used as an important material in an extremely wide range of technical fields and has been utilized in wide use applications. One field among these use applications is the field of pipe. Based on actual results concerning durability in earthquakes, use of the resin is spreading to a gas pipe, a water distribution pipe, and the like.

At present, the resin to be used as a gas pipe, a water distribution pipe, or the like should satisfy excellent long-term durability such as PE80 (MRS: Minimum Required Strength=8 MPa), PE100 (MRS=10 MPa), or preferably PE125 (MRS=12.5 MPa) as defined in ISO 9080 and ISO 12162. Further, it is necessary to have a very high hot internal pressure pipe creep performance as described in ISO 1167. In order to exhibit such a performance, since there is a tendency that durability becomes poor when fluidity is increased, a polyethylene having a low fluidity or melt flow rate (hereinafter, also referred to as "MFR") has been unavoidably used even at the expense of productivity.

Currently, for example, in the standards of a polyethylene pipe for water distribution, in order to secure the durability, the following is defined in pipe thickness design: SDR (Standard dimension ratio)=D/t=11. However, in this case, when a pipe whose nominal diameter is larger, the pipe thickness also increases in proportion and, for example, in the case of a pipe whose nominal diameter is 200, the thickness reaches 20 mm. Therefore, for the reasons of weight increase, economical efficiency, and the like, in order to decrease the pipe thickness, it is necessary to further improve MRS that is a long-term hydrostatic strength of a polyethylene pipe material for water distribution.

In terms of pressure resistance, currently, a ductile cast iron pipe or the like having excellent pressure resistance, weather resistance, and the like as compared to polyethylene pipes have been frequently used as a water distribution pipe that can be used also under a high water pressure. Therefore, in order to use a polyethylene pipe as a substitute for the ductile cast iron pipe, in the polyethylene pipe, it is necessary to improve the pressure resistance, the weather resistance, and the like.

In addition, recently, due to the change in the construction method of pipe laying, there has been required a polyethylene resin which is also excellent in long-term durability even when the surface of a molded pipe is scratched, i.e., is also excellent in slow crack growth (Slow Crack Growth: SCG), such as a notched pipe test defined in ISO 13479.

These polyethylene resins for pipes have been produced by co-polymerization of ethylene and an α-olefin through multistage polymerization in the presence of a Phillips catalyst or a Ziegler catalyst, but the polyethylene resin produced by the Phillips catalyst has a drawback in long-term durability, so that a highly durable polyethylene resin for water distribution pipe, which satisfies PE100, is exclusively produced by the latter Ziegler catalyst.

There are numerous prior art technologies about the polyethylene resins for pipes, which are obtained by the copolymerization of ethylene and an α-olefin through multistage polymerization using a Ziegler catalyst, but it is difficult to produce a polyethylene resin that satisfies the specifications of PE100 and has excellent SCG, stiffness, fluidity, homogeneity, and the like. However, various proposals have been made as follows.

As a proposal for improving the polyethylene resins for pipes which can be produced using a Ziegler catalyst, for example, for the purpose of providing a polyethylene molding compound having a sufficiently high melt strength, which has no risk of cleavage of pipes during production or no risk of sagging problems and, at the same time, can be used in the production of a large diameter thick-walled pipe having homogeneity of the product and mechanical performance that sufficiently meets the quality standards for pipes, for example, long-term resistance to an internal pressure, high stress crack resistance, low-temperature notched impact strength, and high resistance to rapid crack growth, there has been proposed a polymer molding compound produced from 55 to 75% by mass of a first ethylene polymer (A) that is a copolymer of a 1-olefin having a total number of carbon atoms ranging from 4 to 10 and ethylene as a comonomer and has the comonomer in a ratio of 0.2 to 5% by mass relative to the mass of the first ethylene polymer (A) and a broad bimodal molecular mass distribution and 25 to 45% by mass of a second ethylene polymer (B) that is a copolymer produced from an ethylene constituting unit and a 1-olefin having a number of carbon atoms ranging from 4 to 10 and has bimodal molecular mass distribution different from that of the first ethylene polymer (A) (see Patent Document 1).

However, even the compound described in Patent Document 1 has not satisfied the requirements of higher pressure resistance and long-term durability.

Further, there have also been proposed polyethylene resins for pipes produced in the presence of a metallocene catalyst.

For example, for the purpose of providing an improved polyethylene pipe resin, there has been proposed a polyethylene pipe resin that is a polyethylene resin substantially produced by a metallocene catalyst and comprising 35 to 49% by weight of a first polyethylene fraction having high molecular weight and 51 to 65% by weight of a second polyethylene fraction having low molecular weight, wherein the first polyethylene fraction comprises a linear low density polyethylene having a density of 0.928 g/cm$^3$ at highest and an HLMI of less than 0.6 g/10 minutes, the second polyethylene fraction comprises a high density polyethylene having a density of at least 0.969 g/cm$^3$ and an MI$_2$ of higher than 100 g/10 minutes, and the polyethylene resin has a density of higher than 0.951 g/cm$^3$ and an HLMI of 1 to 100 g/10 minutes (see Patent Document 2).

However, even the polyethylene resin described in Patent Document 2 has not satisfied the requirements of the higher pressure resistance and long-term durability.

Moreover, the present applicant has previously proposed a polyethylene resin for a pipe having excellent moldability and balance between mechanical properties of stiffness and SCG and also excellent homogeneity (see Patent Document 3).

That is, in the fields of pipes, particularly water distribution pipes, for the purpose of providing a polyethylene resin that not only satisfies PE100 but also has particularly excellent SCG and sufficient fluidity, homogeneity, and the like and a method of producing the same, as well as a pipe and a joint using the resin, there has been proposed a polyethylene resin for a pipe wherein (a) a high load melt flow rate (HLMFR, HLa) is 5 to 20 g/10 minutes, (b) a density (Da) is 0.945 to 0.965 g/cm³, (c) an α-olefin content (Ca) is 0.05 to 1.5 mol %, and (d) a rupture time (T) by a notched Lander method-ESCR, HLa, and Ca satisfies a specific formula.

The polyethylene resin is preferably a polyethylene resin using a Ziegler catalyst, wherein the HLMFR, density, and α-olefin content are defined, the resin has a configuration specified by a notched Lander method-ESCR method, more preferably a specific α-olefin copolymer is combined in the resin, and the resin is produced by a particular multistage polymerization method. Particularly, PE100 is satisfied in a pipe molded article and also very excellent SCG is possible.

Patent Document 4 discloses a polyethylene for a pipe and a joint, which satisfies the following characteristics (i) to (vi).

Characteristic (i): a high load melt flow rate (HLMFR) at a temperature of 190° C. and a load of 21.6 kg is 8 to 30 g/10 minutes, Characteristic (ii): a density is 0.947 to 0.960 g/cm³, Characteristic (iii): a rupture time in a full notch creep test (measured at 80° C., 5 MPa) is 300 hours or more, Characteristic (iv): a peak top time in isothermal crystallization at 121.5° C. measured on a differential scanning calorimeter (DSC) is 300 seconds or less, and Characteristic (v): a flexural modulus (23° C.) is 950 MPa or more, and Characteristic (vi): a melt tension at 190° C. is 100 mN or more.

However, because of the requirements of higher performance or productivity, in addition to pressure resistance, long-term durability, and fluidity, further improvement in impact resistance has been desired. Particularly, as for the pressure resistance and the impact resistance, thinning of the pipe thickness, weight reduction of the pipe, improvement in service life, expansion of applicable places, improvement of earthquake resistance, and the like can be expected, so that further improvement is particularly preferred.

Patent Document 5 discloses a polyethylene composition wherein it contains a base resin containing a fraction (A) of a low-molecular-weight ethylene homopolymer or copolymer and a fraction (B) of a high-molecular-weight ethylene homopolymer or copolymer, the fraction (A) has average molecular weight lower than that of the fraction (B), the base resin has a weight-average molecular weight (Mw) of 190,000 g/mol to 300,000 g/mol and a complex viscosity at 0.05 radian/second ($\eta^*_{0.05\ radian/second}$) of 75 to 500 kPa·s, but further improvement in the performance has been demanded.

As described above, in the polyethylenes for pipes and joints and molded bodies thereof, there have been required those having a performance, which significantly exceeds a high level of the quality standards for pipes, in the pressure resistance and the long-term durability.

PRIOR ART DOCUMENTS

Patent Documents

Patent Document 1: JP-T-2004-510023
Patent Document 2: JP-T-2004-512410
Patent Document 3: JP-A-2007-002235
Patent Document 4: JP-A-2014-208770
Patent Document 5: JP-T-2015-537092 (the term "JP-T" as used herein means a published Japanese translation of a PCT patent application)

SUMMARY OF THE INVENTION

Problems that the Invention is to Solve

In view of the problems of the prior art described above, particularly in the use applications of pipes and joints, an object of the present invention is to provide a polyethylene for a pipe and a joint, and a molded body thereof, which have high pressure resistance, excellent long-term durability and impact resistance, and, in both methods of an injection molding method and an extrusion molding method, excellent dimensional stability of the injection-molded article and excellent pipe surface appearance.

Means for Solving the Problems

As a result of intensive studies for solving the above problems, the present inventors have found that, by using a polyethylene having specific properties, in particularly in the use applications of pipes and joints, there are obtained a polyethylene for a pipe and a joint, and a molded body thereof, which have high pressure resistance and also excellent long-term durability and impact resistance, can be molded in both methods of an injection molding method and an extrusion molding method, and have excellent dimensional stability of the injection-molded article and excellent pipe surface appearance. Thus, they have accomplished the present invention.

That is, according to the first invention of the present invention, a polyethylene for a pipe and a joint satisfying the following characteristics (1) to (5) are provided:

Characteristic (1): a melt flow rate at a temperature of 190° C. and a load of 21.6 kg (HLMFR) is 5 to 20 g/10 minutes, Characteristic (2): a density (D) is 0.954 to 0.960 g/cm³, Characteristic (3): a ratio of weight-average molecular weight (Mw) and number-average molecular weight (Mn) (Mw/Mn) measured by gel permeation chromatography (GPC) is 15 to 27, Characteristic (4): a rupture time at 80° C. and 5 MPa by a full notch creep test (FNCT) is 150 hours or more, and Characteristic (5): a Charpy impact strength (CIS) measured at −20° C. is 8.5 kJ/m² or more.

According to the second invention of the present invention, the polyethylene for a pipe and a joint according to the first invention, which further satisfies the following characteristic (6), is provided:

Characteristic (6): a relationship between the CIS and the HLMFR satisfies the following formula (1):

$$CIS > -0.1255 \times HLMFR + 11.216 \quad \text{Formula (1)}.$$

According to the third invention of the present invention, the polyethylene for a pipe and a joint according to the first or second invention, which further satisfies the following characteristic (7), is provided:

Characteristic (7): a relationship between the CIS and the density (D) satisfies the following formula (2):

$$CIS > -1375 \times D + 1323 \qquad \text{Formula (2).}$$

According to the fourth invention of the present invention, the polyethylene for a pipe and a joint according to any one of the first to third inventions, wherein the polyethylene contains at least 25 to 35% by weight of the following polyethylene component (a) and 75 to 65% by weight of the polyethylene component (b), is provided:

the polyethylene component (a) being a polyethylene which is polymerized using a metallocene catalyst, has an HLMFR of 0.01 to 0.5 g/10 minutes, and has a density of 0.915 to 0.930 g/cm$^3$ and the polyethylene component (b) being a polyethylene which is at least one of an ethylene homopolymer and a copolymer of ethylene and an α-olefin, has a melt flow rate (MFR) at a temperature of 190° C. and a load of 2.16 kg of 1 to 10 g/10 minutes, a density of 0.960 to 0.975 g/cm$^3$, and an Mw/Mn of 12 to 25.

According to the fifth invention of the present invention, the polyethylene for a pipe and a joint according to the fourth invention, wherein the polyethylene component (b) is an ethylene-based polymer polymerized using a Ziegler catalyst, is provided.

According to the sixth invention of the present invention, the polyethylene for a pipe and a joint according to the fourth or fifth invention, wherein the polyethylene component (a) is polymerized using a metallocene catalyst having a cyclopentadienyl ring and a heterocyclic aromatic group, is provided.

According to the seventh invention of the present invention, the polyethylene for a pipe and a joint according to any one of the fourth to sixth inventions, wherein the polyethylene component (b) is polymerized using a metallocene catalyst having a cyclopentadienyl ring and a fluorenyl ring, is provided.

According to the eighth invention of the present invention, the polyethylene for a pipe and a joint according to the fourth invention, wherein the polyethylene component (b) is composed of 18 to 30% by weight of a polyethylene component (b-1) and 70 to 82% by weight of a polyethylene component (b-2), the polyethylene component (b-1) has an HLMFR of 0.45 to 4.0 g/10 minutes and a density of 0.935 to 0.955 g/cm$^3$, and the polyethylene component (b-2) has an MFR of 50 to 200 g/10 minutes and a density of 0.960 to 0.975 g/cm$^3$, is provided According to the ninth invention of the present invention, a molded body formed from the polyethylene for a pipe and a joint according to any one of the first to eighth inventions, is provided.

According to the tenth invention of the present invention, the molded body according to the ninth invention, wherein the molded body is a pipe or a joint, is provided.

According to the eleventh invention of the present invention, the molded body according to the tenth invention, wherein a breaking time at 20° C. and at a circumferential stress of 13.0 MPa by an internal pressure creep test is 500 hours or more, is provided.

According to the twelfth invention of the present invention, the molded body according to the eleventh invention, wherein an internal pressure at a test temperature of 23° C. and for a use lifetime of 50 years determined by long-term hydrostatic strength (LTHS) measured in accordance with ISO 9080:2012 is 12.5 MPa or more, is provided.

Advantage of the Invention

The polyethylene for a pipe and a joint of the present invention is suitable for gas pipes, water distribution pipes, and joints thereof, particularly, is suitable for polyethylene pipes for water distribution and joints thereof, sufficiently meets the quality standards for pipes, for example, long-term resistance in a state that an internal pressure is applied, high resistance to SCG under stress concentration resulting from a notch shape or the like, and impact resistance at low temperature, and has significantly improved performance as compared to conventional PE100-satisfying materials (hereinafter, also referred to as "PE100 materials"). Therefore, in particular, as for durability, the polyethylene has a performance (corresponding to PE125) that remarkably exceeds conventional PE100 and, in both molding methods of injection molding and extrusion molding, the polyethylene has an effect of exhibiting excellent productivity.

Specifically, in the injection molding, even a thick product can be molded and further, in the extrusion molding, there is an effect that the resistance to pipe surface flaws generated during the molding of pipe products extruded in a molten state and the reduction of polymer gel appearing on the pipe surface are improved and thus the pipe surface appearance becomes good.

Furthermore, since a molded body using the polyethylene for a pipe and a joint of the invention has a performance far beyond conventional quality standards for pipes with respect to durability and impact resistance, the molded body has an effect that thinning of pipe thickness, reduction of pipe weight, improvement in the service life, expansion of applicable places, and the like are possible.

MODES FOR CARRYING OUT THE INVENTION

The polyethylene for a pipe and a joint of the present invention is characterized by satisfying the requirements of specific physical properties and, hereinafter, the present invention will be described in detail for each item.

In the invention, "weight" and "mass" have the same meaning.

1. Characteristics of Polyethylene for Pipe and Joint

The polyethylene of the invention satisfies the following characteristics (1) to (5), and preferably further (6) and (7) to be described later.

Characteristic (1): a melt flow rate (HLMFR) at a temperature of 190° C. and a load of 21.6 kg is 5 to 20 g/10 minutes, Characteristic (2): a density (D) is 0.954 to 0.960 g/cm$^3$, Characteristic (3): a ratio of the weight-average molecular weight (Mw) and number-average molecular weight (Mn) (Mw/Mn) measured by gel permeation chromatography (GPC) is 15 to 27, Characteristic (4): a rupture time at 80° C. and 5 MPa by full notch creep test (FNCT) is 150 hours or more, and Characteristic (5): a Charpy impact strength (CIS) measured at −20° C. is 8.5 kJ/m$^2$ or more.

1-1. Characteristic (1): HLMFR

In the polyethylene for a pipe and a joint of the invention, HLMFR of the characteristic (1) is 5 to 20 g/10 minutes, preferably 7 to 15 g/10 minutes, and more preferably 8 to 12 g/10 minutes.

In the case where HLMFR is lower than the range, the molecular weight increases and the moldability may not be secured due to a decrease in the fluidity. Further, in the case where HLFMR is higher than the range, the long-term durability, particularly SCG using FNCT as an index may decrease.

In the present Description, HLMFR is a value measured in accordance with JIS K6922-2:1997.

HLMFR can be controlled by ethylene polymerization temperature and the use of a chain transfer agent in the production of the polyethylene, and desired one can be obtained. That is, for example, by raising the temperature for polymerization of ethylene and an α-olefin, as a result of lowering the molecular weight, it is possible to increase HLMFR and, by lowering the polymerization temperature, as a result of increasing the molecular weight, HLMFR can be decreased. Further, in the copolymerization reaction of ethylene and an α-olefin, by increasing the amount of coexisting hydrogen (amount of the chain transfer agent), as a result of lowering the molecular weight, it is possible to increase the HLMFR and, by reducing the amount of coexisting hydrogen (the amount of the chain transfer agent), as a result of increasing the molecular weight, HLMFR can be decreased.

Moreover, HLMFR can be controlled by MFR or HLMFR of the polyethylene component (a) and the polyethylene component (b) to be combined and the compositional ratio thereof.

1-2. Characteristic (2): Density

In the polyethylene for a pipe and a joint of the invention, the density of the characteristic (2) is 0.954 to 0.960 g/cm$^3$, preferably 0.954 to 0.959 g/cm$^3$, and more preferably 0.954 to 0.958 g/cm$^3$. When the density is less than 0.954 g/cm$^3$, a flexural modulus decreases and, as a result, the stiffness of the material becomes insufficient and the pressure resistance may lower. On the other hand, when the density exceeds 0.960 g/cm$^3$, the long-term durability, particularly SCG using FNCT as an index may decrease and the impact resistance may lower.

In the present Description, the density of the polyethylene, the polyethylene component (a), the polyethylene component (b), or the like is a value measured in accordance with JIS K6922-1,2:1997.

As for the density, for example, desired one can be obtained by changing the type and amount of the comonomer to be copolymerized with ethylene. Further, it is possible to control the density by the density and compositional ratio of the polyethylene component (a) and the polyethylene component (b) to be combined.

1-3. Characteristic (3): Mw/Mn

In the polyethylene for a pipe and a joint of the present invention, the ratio of the weight-average molecular weight (Mw) to the number-average molecular weight (Mn) (Mw/Mn) of the characteristic (3) as determined by gel permeation chromatography (GPC) is 15 to 27, preferably 18 to 25, and more preferably 21 to 24. When Mw/Mn is less than 15, the durability of the molded body is not sufficient, so that the case is not preferred. On the other hand, when Mw/Mn is larger than 27, the impact resistance, the stress crack resistance, and the like become insufficient, so that the case is not preferred.

In the present Description, Mw/Mn of the polyethylene is a value calculated from the weight-average molecular weight Mw and the number-average molecular weight Mn measured by GPC.

Mw/Mn can be mainly achieved by selecting a polymerization catalyst and polymerization conditions. Further, it is possible to control Mw/Mn by Mw/Mn and the compositional ratio of the polyethylene component (a) and the polyethylene component (b) to be combined.

The measurement of the molecular weight by gel permeation chromatography (GPC) (weight-average molecular weight Mw) can be performed by the following method.

That is, it can be measured by gel permeation chromatography (GPC) under the following conditions.

Apparatus: 150C manufactured by WATERS Co.
Columns: three columns of AD80M/S manufactured by Showa Denko K.K.
Measurement temperature: 140° C.
Concentration: 1 mg/1 ml
Solvent: o-dichlorobenzene Incidentally, the calculation of the molecular weight and the calibration of the column are carried out in accordance with the following methods.

GPC chromatogram data are incorporated into a computer at a frequency of 1 point/second and data processing is performed according to the description of "Size Exclusion Chromatography", Chapter 4, written by Sadao Mori, published by Kyoritsu Shuppan Co., Ltd. to calculate the Mw value.

With regard to the calibration of the column, using a 0.2 mg/ml solution of each of monodisperse polystyrenes (S-7300, S-3900, S-1950, S-1460, S-1010, S-565, S-152, S-66.0, S-28.5, S-5.05) manufactured by Showa Denko K.K., n-eicosane, and n-tetracontane, a series of monodisperse polystyrenes were measured, the relationship between the elution peak time and logarithm of the molecular weight is fitted with a polynomial of degree four, and resulting one is used as a calibration curve.

The molecular weight of polystyrene (MPS) is converted into the molecular weight of polyethylene (MPE) using the following equation. MPE=0.468×MPS 1-4. Characteristic (4): FNCT In the polyethylene for a pipe and a joint of the invention, the rupture time at 80° C. and 5 MPa by a full notch creep test (FNCT) of the characteristic (4) is 150 hours or more, preferably 160 hours or more, and more preferably 170 hours or more.

When FNCT is less than 150 hours, the durability in the molded body may be poor, so that the case is not preferred.

In the present Description, the rupture time in FNCT (measured at 80° C. and 5 MPa) is a value measured at 80° C. and 5 MPa in accordance with the full-circumference notch-type tensile creep test of Annex 1 of JIS K6774 (1995) "Polyethylene Pipe for Gas". As a specimen, there is used full-circumference notched one (test piece thickness: 6 mm, notch depth: 1 mm, full circumference) cut out from a compression molded sheet having a thickness of 6 mm, which is prepared under the conditions described in Table 2 of JIS K6922-2 (1997) "Plastic—Polyethylene (PE) Molding and Extruding Materials—Part 2: Method for Preparing Specimen and Method for Determining Various Properties".

In addition, as a test solution, not water but a 1% aqueous sodium alkyl sulfate solution is used.

The rupture time in FNCT (measured at 80° C. and 5 MPa) can be generally increased, for example, by reducing the density of the polyethylene component (a) constituting the polyethylene and decreasing HLMFR thereof.

1-5. Characteristic (5): CIS

In the polyethylene for a pipe and a joint of the invention, Charpy impact strength (CIS) measured at −20° C. of the characteristic (5) is 8.5 kJ/m$^2$ or more, preferably 9.0 kJ/m$^2$ or more, and more preferably 10 kJ/m$^2$ or more. An upper limit value of CIS is not particularly limited but is usually 50 KJ/m$^2$.

When CIS is less than 8.5 kJ/m$^2$, the impact resistance in the molded body may be poor, so that the case is not preferred.

Here, the Charpy impact strength at −20° C. is measured in accordance with JIS K7111 (1996) "Plastic—Test Method for Charpy Impact Strength" with preparing a specimen in accordance with JIS K6922-2 (1997) "Plastic—Polyethylene (PE) Molding and Extruding Materials—Part 2: Method for Preparing Specimen and Method for Determining Various Properties".

The Charpy impact strength at −20° C. can be increased by increasing the molecular weight of the ethylene-based polymer or narrowing the molecular weight distribution.

1-6. Characteristic (6): Formula (1)

The polyethylene for a pipe and a joint of the invention preferably further satisfies the following characteristic (6).

Characteristic (6): the relationship between the CIS and HLMFR satisfies the following formula (1).

$$CIS > -0.1255 \times HLMFR + 11.216 \quad \text{Formula (1)}$$

The technical meaning of the formula (1) shows that the polyethylene of the invention exhibits a relatively large value of CIS relative to HLMFR and exhibits a high value of CIS even when the fluidity is comparable, indicating that the polyethylene is a material having excellent impact resistance.

In order to distinguish between the polyethylene of the invention and prior art polyethylene, when the prior art polyethylene is plotted with CIS (unit: KJ/m$^2$) on the vertical axis and HLMFR (unit: g/10 minutes) on the horizontal axis, the inclination of the plots has negative correlation. The linear expression approximation of the plots is performed and a value of the intercept on the CIS axis is set so as to distinguish it from the polyethylene of the invention while the inclination is made the same as the inclination of the linear expression, thereby determining the formula (1).

In the invention, in order to produce a polyethylene that satisfies the formula (1), it is necessary to obtain a polyethylene that satisfies the characteristics (1) to (4) and, in particular, the necessity can be achieved by combining plural polyethylene components. It is important that the polyethylene components to be combined have specific density, HLMFR, MFR, Mw/Mn, and mixing ratio and, in particular, MFR of the low-molecular-weight component is made small.

1-7. Characteristic (7): Formula (2)

The polyethylene for a pipe and a joint of the invention preferably further satisfies the following characteristic (7).

Characteristic (7): the relationship between CIS and the density (D) satisfies the following formula (2).

$$CIS > -1375 \times D + 1323 \quad \text{Formula (2)}$$

The technical meaning of the formula (2) is that the polyethylene of the invention exhibits a relatively large value of CIS relative to the density (D) and exhibits a high value of CIS even when the density (stiffness) is comparable, indicating that the polyethylene is a material having excellent impact resistance.

In order to distinguish between the polyethylene of the invention and prior art polyethylene, when the prior art polyethylene is plotted with CIS (unit: KJ/m$^2$) on the vertical axis and the density (D) (unit: g/cm$^3$) on the horizontal axis, the inclination of the plots has negative correlation. Linear expression approximation of the plots is performed and a value of the intercept on the CIS axis is set so as to distinguish it from the polyethylene of the invention while the inclination is made the same as the inclination of the linear expression, thereby determining the formula (2).

In the invention, in order to produce a polyethylene that satisfies the formula (2), it is necessary to obtain a polyethylene that satisfies the characteristics (1) to (4) and, in particular, the necessity can be achieved by combining plural polyethylene components. It is important that the polyethylene components to be combined have specific density, HLMFR, MFR, Mw/Mn, and mixing ratio and, in particular, MFR of the low-molecular-weight component is made small.

1-8. Characteristic (8): Internal Pressure Creep Test

In the polyethylene composition for pipes and joints of the invention, the rupture time at 20° C. and a circumferential stress of 13.0 MPa by an internal pressure creep test of a pipe according to the characteristic (8) is 500 hours or more, preferably 600 hours or more, and more preferably 700 hours or more.

When the rupture time in the internal pressure creep test (measured at 20° C. and a circumferential stress of 13.0 MPa) is less than 500 hours, the pressure resistance in long-term use in the molded body may be poor, so that the case is not preferred.

In the present Description, the rupture time in the internal pressure creep test (measured at 20° C. and a circumferential stress of 13.0 MPa) is a value measured at 20° C. and a circumferential stress of 13.0 MPa in accordance with ISO1167 (2006). As a specimen, there is used a pipe having an outer diameter of 32 mm, a thickness of 3 mm, and a length of 350 mm. Further, the test environment is set to underwater, and water is fed into the pipe and pressurized.

The rupture time in the internal pressure creep test (measured at 20° C. and a circumferential stress of 13.0 MPa) can be generally increased, for example, by decreasing the density of the polyethylene component (a) constituting the polyethylene and reducing HLMFR thereof and, in addition, by increasing the density of the polyethylene component (b).

2. Polyethylene Component (a)

Since the polyethylene of the present invention is easily prepared and becomes a preferable polyethylene for a pipe and a joint, the polyethylene for a pipe and a joint of the invention is obtained by polymerization using a metallocene catalyst, preferably by polymerization using a metallocene catalyst containing Ti, Zr, or Hf and preferably contains a polyethylene component (a) in which HLMFR is 0.01 to 0.5 g/10 minutes, the density is 0.915 to 0.930 g/cm$^3$, and Mw/Mn is 3.0 to 5.0.

HLMFR of the polyethylene component (a) is in a range of 0.01 g/10 minutes or more and 0.5 g/10 minutes or less, preferably 0.05 to 0.2 g/10 minutes, more preferably 0.1 to 0.15 g/10 minutes. When the HLMFR is less than 0.01 g/10 minutes, it cannot be achieved to control HLMFR within the defined range in the final polyethylene, and the fluidity may lower. On the other hand, when the HLMFR exceeds 0.5 g/10 minutes, the long-term durability, particularly SCG using FNCT as an index may lower in the final polyethylene.

In the production of polyethylene, HLMFR can be controlled by ethylene polymerization temperature and the use of a chain transfer agent, and desired one can be obtained. That is, for example, by raising the temperature for the polymerization of ethylene and an α-olefin, as a result of lowering the molecular weight, it is possible to increase HLMFR and, by lowering the polymerization temperature, as a result of increasing the molecular weight, HLMFR can be decreased. Further, in the copolymerization reaction of ethylene and an α-olefin, by increasing the amount of coexisting hydrogen (amount of the chain transfer agent), as a result of lowering the molecular weight, it is possible to increase the HLMFR and, by reducing the amount of coexisting hydrogen (the amount of the chain transfer agent), as a result of increasing the molecular weight, HLMFR can be decreased.

The density of the polyethylene component (a) is 0.915 to 0.930 g/cm$^3$, preferably 0.915 to 0.925 g/cm$^3$, and more preferably 0.920 to 0.925 g/cm$^3$. When the density is less than 0.915 g/cm³, the density range in the final polyethylene cannot be achieved and the flexural modulus decreases and, as a result, the stiffness of the material becomes insufficient, so that the pressure resistance may decrease. On the other hand, when the density exceeds 0.930 g/cm³, the long-term durability of the final polyethylene, particularly SCG using FNCT as an index may decrease.

The density is a value measured in accordance with JIS K6922-1,2:1997.

As for the density, desired one can be obtained by changing the type and amount of the comonomer to be copolymerized with ethylene.

The Mw/Mn of the polyethylene component (a) is preferably 2.0 or more, more preferably 2.5 or more, more preferably 3.0 or more, and particularly preferably 3.2 or more, and is preferably less than 5.0, more preferably 4.5 or less, more preferably 4.0 or less, and particularly preferably 3.8 or less. Mw/Mn of the polyethylene component (a) may be limited by any one of the above upper limit values and any one of the above lower limit values. For example, it is 2.0 to less than 5.0, 2.0 to 4.5, 2.5 to 4.0, 3.0 to less than 5.0, 3.2 to 3.8, or the like.

Mw/Mn of the polyethylene component (a) of the invention is preferably 2.0 to less than 5.0. When Mw/Mn is less than 2.0, MFR of the polyethylene composition may decrease and thus the moldability may decrease. On the other hand, when Mw/Mn is 5.0 or more, the long-term durability of the polyethylene composition, particularly SCG using FNCT as an index may decrease.

Mw/Mn is a value calculated from the weight-average molecular weight Mw and the number-average molecular weight Mn which are measured by GPC.

As for Mw/Mn, for example, it is possible to obtain desired one by changing polymerization conditions such as polymerization temperature.

The polyethylene component (a) is polymerized with a metallocene catalyst, preferably a metallocene catalyst containing Ti, Zr, or Hf. As the metallocene catalyst, there is exemplified one obtained by combining a complex in which a ligand having a cyclopentadiene skeleton is coordinated to a transition metal and a cocatalyst. As specific metallocene catalysts, there may be mentioned those obtained by combining complex catalysts in which a ligand having a cyclopentadiene skeleton such as methylcyclopentadiene, dimethylcyclopentadiene, or indene is coordinated to a transition metal including Ti, Zr, or Hf and an organometallic compound belonging to the group 1 to the group 3 elements in the long period type periodic table (hereinafter simply referred to as "periodic table"), such as aluminoxane, and supported ones obtained by supporting the complex catalysts on a carrier such as silica.

The metallocene catalyst to be used in the invention contains a catalyst component (A) and a catalyst component (B) to be described below, and is a catalyst which, if necessary, comprises a catalyst component (C) in combination.

Catalyst component (A): a metallocene compound
Catalyst component (B): a compound that reacts with the catalyst component (A) to form a cationic metallocene compound
Catalyst component (C): a fine particulate carrier
(1) Catalyst Component (A)

As the catalyst component (A), a metallocene compound of a transition metal belonging to the group 4 in the periodic table is used. Specifically, compounds represented by the following general formulae (I) to (VI) are used.

$$(C_5H_{5-a}R^1_a)(C_5H_{5-b}R^2_b)MXY \quad (I)$$

$$Q(C_5H_{4-c}R^1_c)(C_5H_{4-d}R^2_d)MXY \quad (II)$$

$$Q'(C_5H_{4-e}R^3_e)ZMXY \quad (III)$$

$$(C_5H_{5-f}R^3_f)ZMXY \quad (IV)$$

$$(C_5H_{5-f}R^3_f)MXYW \quad (V)$$

$$Q''(C_5H_{5-g}R^4_g)(C_5H_{5-h}R^5_h)MXY \quad (VI)$$

Here, Q represents a bonding group that crosslinks two conjugated five-membered ring ligands, Q' represents a bonding group that crosslinks the conjugated five-membered ring ligand and the Z group, Q" represents a bonding group that crosslinks $R^4$ and $R^5$, M represents Ti, Zr, or Hf, X, Y, and W represent each independently a hydrogen atom, a halogen atom, a hydrocarbon group having 1 to 20 carbon atoms, an oxygen-containing hydrocarbon group having 1 to 20 carbon atoms, a nitrogen-containing hydrocarbon group having 1 to 20 carbon atoms, a phosphorus-containing hydrocarbon group having 1 to 20 carbon atoms, or a silicon-containing hydrocarbon having 1 to 20 carbon atoms, Z represents a ligand containing an oxygen atom or a sulfur atom, a silicon-containing hydrocarbon group having 1 to 40 carbon atoms, a nitrogen-containing hydrocarbon group having 1 to 40 carbon atoms, or a phosphorus-containing hydrocarbon group having 1 to 40 carbon atoms.

$R^1$ to $R^5$ represent each independently a hydrocarbon group having 1 to 20 carbon atoms, a halogen group, a halogen-containing hydrocarbon group having 1 to 20 carbon atoms, an alkoxy group, an aryloxy group, an oxygen-containing hydrocarbon group, a sulfur-containing hydrocarbon group, a silicon-containing hydrocarbon group, a phosphorus-containing hydrocarbon group, a nitrogen-containing hydrocarbon group, or a boron-containing hydrocarbon group. Further, adjacent two $R^1$, two $R^2$, two $R^3$, two $R^4$, or two $R^5$ may be combined with each other to form a ring having 4 to 10 carbon atoms. Moreover, a, b, c, d, e, f, g, and h are integers that satisfy $0 \leq a \leq 5$, $0 \leq b \leq 5$, $0 \leq c \leq 4$, $0 \leq d \leq 4$, $0 \leq e \leq 4$, $0 \leq f \leq 5$, $0 \leq g \leq 5$, and $0 \leq h \leq 5$, respectively.

As the binding group Q that crosslinks the two conjugated five-membered ring ligands, the bonding group Q' that crosslinks the conjugated five-membered ring ligand and the Z group, and the bonding group Q" that crosslinks $R^4$ and $R^5$, those described below may be specifically mentioned.

That is, the groups are alkylene groups such as a methylene group and an ethylene group, alkylidene groups such as an ethylidene group, a propylidene group, an isopropylidene group, a phenylmethylidene group, and a diphenylmethylidene group, silicon-containing crosslinking groups such as a dimethylsilylene group, a diethylsilylene group, a dipropylsilylene group, a diphenylsilylene group, a methylethylsilylene group, a methylphenylsilylene group, a methyl-t-butylsilylene group, a disilylene group, and a tetramethyldisilylene group, germanium-containing crosslinking groups, alkylphosphines, amines, and the like. Of these, alkylene groups, alkylidene groups, silicon-containing crosslinking groups, and germanium-containing crosslinking groups are particularly preferably used.

Specific Zr complexes represented by the aforementioned general formulae (I), (II), (III), (IV), (V), and (VI) will be exemplified below, but compounds in which Zr is replaced with Hf or Ti can be used as well.

Further, the catalyst component (A) represented by each of the general formulae (I), (II), (III), (IV), (V), and (VI) can be used as a mixture of two or more compounds among the compounds represented by the same general formula or the compounds represented by different general formulae.

Compounds of General Formula (I):

biscyclopentadienylzirconium dichloride, bis(2-methylindenyl)zirconium dichloride, bis(2-methyl-4,5-benzoindenyl)zirconium dichloride, bisfluorenylzirconium dichloride, bis(4H-azulenyl)zirconium dichloride, bis(2-methyl-4H-azulenyl)cyclopentadienylzirconium dichloride, bis(2-methyl-4-phenyl-4H-azulenyl)zirconium dichloride, bis(2-methyl-4-(4-chlorophenyl)-4H-azulenyl)zirconium dichloride.

bis(2-furylcyclopentadienyl)zirconium dichloride, bis(2-furylindenyl)zirconium dichloride, bis(2-furyl-4,5-benzoindenyl)zirconium dichloride.

Compounds of General Formula (II):

dimethylsilylenebis(1,1'-cyclopentadienyl)zirconium dichloride, dimethylsilylenebis[1,1'-(2-methylindenyl)]zirconium dichloride, dimethylsilylenebis[1,1'-(2-methylindenyl)]zirconium dichloride, ethylenebis[1,1'-(2-methyl-4,5-benzoindenyl)]zirconium dichloride, dimethylsilylenebis[1,1'-(2-methyl-4-hydroazulenyl)]zirconium dichloride, dimethylsilylenebis[1,1'-(2-methyl-4-phenyl-4-hydroazulenyl)]zirconium dichloride, dimethylsilylenebis {1,1'-[2-methyl-4-(4-chlorophenyl)-4-hydroazulenyl]}zirconium dichloride, dimethylsilylenebis[1,1'-(2-ethyl-4-phenyl-4-hydroazulenyl)]zirconium dichloride, ethylenebis[1,1'-(2-methyl-4-hydroazulenyl)]zirconium dichloride.

dimethylsilylenebis[1,1'-(2-furyl cyclopentadienyl)]zirconium dichloride, dimethylsilylenebis {1,1'-[2-(2-furyl)-4,5-dimethyl-cyclopentadienyl]}zirconium dichloride, dimethylsilylenebis{1,1'-{2-[2-(5-trimethylsilyl)furyl]-4,5-dimethyl-cyclopentadienyl}zirconium dichloride, dimethylsilylenebis{1,1'-[2-(2-furyl)indenyl]}zirconium dichloride, dimethylsilylenebis {1,1'-[2-(2-furyl)-4-phenyl-indenyl]}zirconium dichloride, isopropylidene(cyclopentadienyl)(9-fluorenyl)zirconium dichloride, isopropylidene(cyclopentadienyl)[9-(2,7-t-butyl)fluorenyl]zirconium dichloride, diphenylmethylene(cyclopentadienyl)(9-fluorenyl)zirconium dichloride, diphenylmethylene(cyclopentadienyl) [9-(2,7-t-butyl)fluorenyl]zirconium dichloride, dimethylsilylene(cyclopentadienyl)(9-fluorenyl)zirconium dichloride, diphenylsilylene(cyclopentadienyl) [9-(2,7-t-butyl)fluorenyl]zirconium dichloride.

Compounds of general formula (III):

(tertiary butylamide)(tetramethyl-$\eta^5$-cyclopentadienyl)-1,2-ethanediylzirconium dichloride, (methylamide)-(tetramethyl-$\eta^5$-cyclopentadienyl)-1,2-ethanediyl-zirconium dichloride, (ethylamide)(tetramethyl-$\eta^5$-cyclopentadienyl)-methylenezirconium dichloride, (tertiary butylamide)dimethyl-(tetramethyl-$\eta^5$-cyclopentadienyl)silanezirconium dichloride, (tertiary butylamide)dimethyl(tetramethyl-$\eta^5$-cyclopentadienyl)silanezirconium dibenzyl, (benzylamide)dimethyl(tetramethyl-$\eta^5$-cyclopentadienyl)silanezirconium dichloride, (phenylphosphide)dimethyl(tetramethyl-$\eta^5$-cyclopentadienyl)silanezirconium dibenzyl.

Compounds of General Formula (IV):

(cyclopentadienyl)(phenoxy)zirconium dichloride, (2,3-dimethylcyclopentadienyl)(phenoxy)zirconium dichloride, (pentamethylcyclopentadienyl)(phenoxy)zirconium dichloride, (cyclopentadienyl)(2,6-di-t-butylphenoxy)zirconium dichloride, (pentamethylcyclopentadienyl)(2,6-di-i-propyl-phenoxy)zirconium dichloride.

Compounds of General Formula (V):

(cyclopentadienyl)zirconium trichloride, (2,3-dimethyl-cyclopentadienyl)zirconium trichloride, (pentamethylcyclopentadienyl)zirconium trichloride, (cyclopentadienyl)zirconium triisopropoxide, (pentamethylcyclopentadienyl)zirconium triisopropoxide.

Compounds of General Formula (VI):

ethylenebis(7,7'-indenyl)zirconium dichloride, dimethylsilylenebis {7,7'-(1-methyl-3-phenylindenyl)}zirconium dichloride, dimethylsilylenebis {7,7'-[1-methyl-4-(1-naphthyl)indenyl]}zirconium dichloride, dimethylsilylenebis[7,7'-(1-ethyl-3-phenylindenyl)]zirconium dichloride, dimethylsilylenebis {7,7'-[1-isopropyl-3-(4-chlorophenyl)indenyl]}zirconium dichloride.

Incidentally, compounds in which the silylene group in the compounds of these specific examples is replaced with a germylene group are also exemplified as preferable compounds.

Among the catalyst components (A) described in the above, as a preferred metallocene complex for producing the polyethylene component (a), the metallocene complex represented by the general formula (I) or the general formula (II) is preferred and further, from the viewpoint of capability of generating a polymer having a high molecular weight and excellent copolymerizability in the copolymerization of ethylene and other α-olefins, the metallocene complex represented by the general formula (II) is preferred. The capability of producing a high-molecular-weight body has an advantage that polymers having various molecular weights can be designed by various methods for controlling the molecular weight of a polymer as described later.

One method for satisfying the characteristics of the polyethylene of the present invention is to introduce long-chain branching into an ethylene-based polymer but, from the viewpoint of capability of producing a polyethylene having high molecular weight and long-chain branching, the following two compound groups are preferred among the metallocene complexes represented by the general formula (II).

As a preferred embodiment, the first compound group is a crosslinked metallocene complex containing at least one heterocyclic aromatic group in the compound as $R^1$ to $R^2$. As preferred heterocyclic aromatic groups, there may be mentioned a group consisting of a furyl group, a benzofuryl group, a thienyl group, and a benzothienyl group. These substituents may further have a substituent such as a silicon-containing group. Among substituents selected from the group consisting of a furyl group, a benzofuryl group, a thienyl group, and a benzothienyl group, a furyl group and a benzofuryl group are further preferred. Furthermore, the substituent is preferably introduced into the 2-position of the substituted cyclopentadienyl group or the substituted indenyl group and particularly preferred is a compound having at least one substituted cyclopentadienyl group having no other condensed ring structure.

The second compound group is a crosslinked metallocene complex having a substituted cyclopentadienyl group and a substituted fluorenyl group in combination.

The metallocene complex is preferably used as a supported catalyst as described below. In the first compound group, it is considered that heterogeneity is generated at the active site structure by the interaction between a solid acid on the carrier and the so-called heteroatom contained in the furyl group or the thienyl group, and thus the long-chain branching is easily formed. Also in the second compound group, it is considered that, since the space around the active site is changed by the use of the supported catalyst, the long-chain branching is easily formed.

(2) Catalyst Component (B)

The method for producing a polyethylene component (a) according to the present invention is characterized in that, as essential components of the olefin polymerization catalyst, in addition to the above catalyst component (A), the compound that reacts with the catalyst component (A) (hereinafter sometimes referred to as "component (A)" or simply "A") to form a cationic metallocene compound (catalyst component (B), hereinafter sometimes simply referred to as "B"), and, if necessary, the fine particle carrier (catalyst component (C), hereinafter sometimes simply referred to as "C"), are contained.

As one of the catalyst component (B) that reacts with the catalyst component (A) to form a cationic metallocene compound, an organoaluminum oxy compound may be mentioned.

The organoaluminum oxy compound has an Al—O—Al bond in the molecule, and the number of the bonds is in the range of usually 1 to 100, preferably 1 to 50. Such organoaluminum oxy compound is usually a product obtained by reacting an organoaluminum compound with water.

The reaction of the organoaluminum with water is usually carried out in an inert hydrocarbon (solvent). As the inert hydrocarbon, there can be used aliphatic hydrocarbons, alicyclic hydrocarbons, and aromatic hydrocarbons such as pentane, hexane, heptane, cyclohexane, methylcyclohexane, benzene, toluene, and xylene, but it is preferable to use an aliphatic hydrocarbon or an aromatic hydrocarbon.

As the organoaluminum compound to be used for preparing the organoaluminum oxy compound, any of the compounds represented by the following general formula (4) can be used but preferably, a trialkylaluminum is used.

$$R^5{}_t AlX^3{}_{3-t} \tag{4}$$

wherein $R^5$ represents a hydrocarbon group such as an alkyl group having 1 to 18 carbon atoms, preferably 1 to 12 carbon atoms, an alkenyl group, an aryl group, or an aralkyl group, $X^3$ represents a hydrogen atom or a halogen atom, and t represents an integer of $1 \leq t \leq 3$.

The alkyl group in the trialkylaluminum may be any of a methyl group, an ethyl group, a propyl group, an isopropyl group, a butyl group, an isobutyl group, a pentyl group, a hexyl group, an octyl group, a decyl group, or a dodecyl group, but a methyl group is particularly preferred.

The above organoaluminum compounds may be also used in combinations of two or more thereof.

The reaction ratio of water to the organoaluminum compound (molar ratio of water/Al) is preferably 0.25/1 to 1.2/1, particularly preferably 0.5/1 to 1/1, and the reaction temperature is usually in the range of usually −70 to 100° C., preferably −20 to 20° C. The reaction time is selected from the range of usually 5 minutes to 24 hours, preferably 10 minutes to 5 hours. As the water required for the reaction, there may be utilized not only simple water but also crystal water contained in copper sulfate hydrate, aluminum sulfate hydrate, or the like and a component from which water may be formed in the reaction system.

Of the organoaluminum oxy compounds described above, one obtained by reacting an alkylaluminum and water is usually referred to as an aluminoxane and particularly, methylaluminoxane (including those essentially composed of methylaluminoxane (MAO)) is preferable as the organoaluminum oxy compound.

Of course, as the organoaluminum oxy compound, two or more of the organoaluminum oxy compounds described above can also be used in combination, and a solution or dispersion of the organoaluminum oxy compound in a aforementioned inert hydrocarbon solvent mentioned above may be used.

In addition, as other specific examples of the catalyst component (B), borane compounds and borate compound may be mentioned.

The borane compounds more specifically expressed include triphenylborane, tri(o-tolyl)borane, tri(p-tolyl)borane, tri(m-tolyl)borane, tri(o-fluorophenyl)borane, tris(p-fluorophenyl)borane, tris(m-fluorophenyl)borane, tris(2,5-difluorophenyl)borane, tris(3,5-difluorophenyl)borane, tris(4-trifluoromethylphenyl)borane, tris(3,5-ditrifluoromethylphenyl)borane, tris(2,6-ditrifluoromethylphenyl)borane, tris(pentafluorophenyl)borane, tris(perfluoronaphthyl)borane, tris(perfluorobiphenyl), tris(perfluoroanthryl)borane, tris(perfluorobinaphthyl)borane, and the like.

Of these, tris(3,5-ditrifluoromethylphenyl)borane, tris(2,6-ditrifluoromethylphenyl)borane, tris(pentafluorophenyl)borane, tris(perfluoronaphthyl)borane, tris(perfluorobiphenyl)borane, tris(perfluoroanthryl)borane, and tris(perfluorobinaphthyl)borane are more preferred, and more preferably, tris(2,6-ditrifluoromethylphenyl)borane, tris(pentafluorophenyl)borane, tris(perfluoronaphthyl)borane, and tris(perfluorobiphenyl)borane are exemplified as preferred compounds.

Further, when the borate compound is specifically expressed, a first example is a compound represented by the following general formula (5).

$$[L^1\text{-}H]^+[BR^6R^7X^4X^5]^- \tag{5}$$

In the formula (5), $L^1$ is a neutral Lewis base, H is a hydrogen atom, $[L^1\text{-}H]$ is a Bronsted acid such as an ammonium, an anilinium, or a phosphonium.

As the ammonium, there can be exemplified trialkyl-substituted ammoniums such as trimethylammonium, triethylammonium, tripropylammonium, tributylammonium, and tri(n-butyl)ammonium, and dialkylammoniums such as di(n-propyl)ammonium and dicyclohexylammonium.

As the anilinium, there can be exemplified N,N-dialkylaniliniums such as N,N-dimethylanilinium, N,N-diethylanilinium, and N,N-2,4,6-pentamethylanilinium.

Furthermore, as the phosphonium, there may be mentioned triarylphosphoniums such as triphenylphosphonium, tributylphosphonium, tri(methylphenyl)phosphonium, and tri(dimethylphenyl)phosphonium, and trialkylphosphoniums.

In the formula (5), $R^6$ and $R^7$ are each an aromatic or substituted aromatic hydrocarbon group having 6 to 20, preferably 6 to 16 carbon atoms, which is the same or different from each other, and may be linked to each other with a crosslinking group. As the substituent of the substituted aromatic hydrocarbon group, preferred is an alkyl group represented by a methyl group, an ethyl group, a propyl group, or an isopropyl group, or a halogen such as fluorine, chlorine, bromine, or iodine.

Furthermore, $X^4$ and $X^5$ are each independently a hydride group, a halide group, a hydrocarbon group containing 1 to 20 carbon atoms, or a substituted hydrocarbon group containing 1 to 20 carbon atoms, one or more hydrogen atoms of which are replaced with a halogen atom.

As specific examples of the compound represented by the above general formula (5), there can be exemplified tributylammonium tetra(pentafluorophenyl)borate, tributylammonium tetra(2,6-ditrifluoromethylphenyl)borate, tributylammonium tetra(3,5-ditrifluoromethylphenyl)borate, tributylammonium tetra(2,6-difluorophenyl)borate, tributylammonium tetra(perfluoronaphthyl)borate, dimethylanilinium tetra(pentafluorophenyl)borate, dimethylanilinium tetra(2,6-ditrifluoromethylphenyl)borate, dimethylanilinium tetra(3,5-ditrifluoromethylphenyl)borate, dimethylanilinium tetra(2,6-difluorophenyl)borate, dimethylanilinium tetra(perfluoronaphthyl)borate, triphenylphosphonium tetra(pentafluorophenyl)borate, triphenylphosphonium tetra(2,6-ditrifluoromethylphenyl)borate, triphenylphosphonium tetra(3,5-ditrifluoromethylphenyl)borate, triphenylphosphonium tetra(2,6-difluorophenyl)borate, triphenylphosphonium tetra(perfluoronaphthyl)borate, trimethylammonium tetra(2,6-ditrifluoromethylphenyl)borate, triethylammonium tetra(pentafluorophenyl)borate, triethylammonium tetra(2,6-ditrifluoromethylphenyl)borate, triethylammonium tetra(perfluoro-naphthyl)borate, tripropylammonium tetra(pentafluorophenyl)borate, tripropylammonium tetra(2,6-ditrifluoromethylphenyl)borate, tripropyl ammonium tetra(perfluoronaphthyl)borate, di(1-propyl)ammonium tetra(pentafluorophenyl)borate, dicyclohexylammonium tetraphenylborate, and the like.

Of these, preferred are tributylammonium tetra(pentafluorophenyl)borate, tributylammonium tetra(2,6-ditrifluoromethylphenyl)borate, tributylammonium tetra(3,5-ditrifluoromethylphenyl)borate, tributylammonium tetra(perfluoronaphthyl)borate, dimethylanilinium tetra(pentafluorophenyl)borate, dimethylanilinium tetra(2,6-ditrifluoromethylphenyl)borate, dimethylanilinium tetra(3,5-ditrifluoromethylphenyl)borate, and dimethylanilinium tetra(perfluoronaphthyl)borate.

Further, a second example of the borate compound is represented by the following general formula (6).

$[L^2]^+[BR^6R^7X^4X^5]^-$  (6)

In the formula (6), as $L^2$, there may be mentioned a carbocation, a methyl cation, an ethyl cation, a propyl cation, an isopropyl cation, a butyl cation, an isobutyl cation, a tert-butyl cation, a pentyl cation, a tropinium cation, a benzyl cation, a trityl cation, a sodium cation, a proton, or the like. Further, $R^6$, $R^7$, $X^4$, and $X^5$ are the same as defined in the above general formula (5).

As specific examples of the compound represented by the above general formula (6), there can be exemplified trityl tetraphenylborate, trityl tetra(o-tolyl)borate, trityl tetra(p-tolyl)borate, trityl tetra(m-tolyl)borate, trityl tetra(o-fluorophenyl)borate, trityl tetra(p-fluorophenyl)borate, trityl tetra(m-fluorophenyl)borate, trityl tetra(3,5-difluorophenyl)borate, trityl tetra(pentafluorophenyl)borate, trityltetra(2,6 ditrifluoromethylphenyl)borate, trityl tetra(3,5-ditrifluoromethylphenyl)borate, trityl tetra(perfluoronaphthyl)borate, tropinium tetraphenylborate, tropinium tetra(o-tolyl)borate, tropinium tetra(p-tolyl)borate, tropinium tetra(m-tolyl)borate, tropinium tetra(o-fluorophenyl)borate, tropinium tetra(p-fluorophenyl)borate, tropinium tetra(3,5-fluorophenyl)borate, tropinium tetra(3,5-difluorophenyl)borate, tropinium tetra(pentafluorophenyl)borate, tropinium tetra(2,6-ditrifluoromethylphenyl)borate, tropinium tetra(3, 5-ditrifluoromethylphenyl)borate, tropinium tetra(perfluoronaphthyl)borate, $NaBPh_4$, $NaB(o-CH_3-Ph)_4$, $NaB(p-CH_3-Ph)_4$, $NaB(m-CH_3-Ph)_4$, $NaB(o-F-Ph)_4$, $NaB(p-F-Ph)_4$, $NaB(m-F-Ph)_4$, $NaB(3,5-F_2-Ph)_4$, $NaB(C_6F_5)_4$, $NaB(2,6-(CF_3)_2-Ph)_4$, $NaB(3,5-(CF_3)_2-Ph)_4$, $NaB(C_{10}F_7)_4$, $H^+BPh_4.2$ diethyl ether, $H^+B(3,5-F_2-Ph)_4.2$ diethyl ether, $H^+B(C_6F_5)_4^-.2$ diethyl ether, $H^+B(2,6-(CF_3)_2-Ph)_4.2$ diethyl ether, $H^+B(3,5-(CF_3)_2-Ph)_4.2$ diethyl ether, and $H^+B(C_{10}H_7)_4.2$ diethyl ether. Incidentally, the above "Ph" represents a phenyl group.

Of these, preferred are trityl tetra(pentafluorophenyl)borate, trityl tetra(2,6-ditrifluoromethylphenyl)borate, trityl tetra(3,5-ditrifluoromethylphenyl)borate, trityl tetra(perfluoronaphthyl)borate, tropinium tetra(pentafluorophenyl)borate, tropinium tetra(2,6-ditrifluoromethylphenyl)borate, tropinium tetra(3,5-ditrifluoromethylphenyl)borate, tropinium tetra(perfluoronaphthyl)borate, $NaB(C_6F_5)_4$, $NaB(2,6-(CF_3)_2-Ph)_4$, $NaB(3,5-(CF_3)_2-Ph)_4$, $NaB(C_{10}F_7)_4$, $H^+B(C_6F_5)_4^-.2$ diethyl ether, $H^+B(2,6-(CF_3)_2-Ph)_4.2$ diethyl ether, $H^+B(3,5-(CF_3)_2-Ph)_4.2$ diethyl ether, and $H^+B(C_{10}H_7)_4.2$ diethyl ether.

More preferably, of these, there may be mentioned trityl tetra(pentafluorophenyl)borate, trityl tetra(2,6-ditrifluoromethylphenyl)borate, tropinium tetra(pentafluorophenyl)borate, tropinium tetra(2,6-difluoromethylphenyl)borate, $NaB(C_6F_5)_4$, $NaB(2,6-(CF_3)_2-Ph)_4$, $H^+B(C_6F_5)_4^-.2$ diethyl ether, $H^+B(2,6-(CF_3)_2-Ph)_4.2$ diethyl ether, $H^+B(3,5-(CF_3)_2-Ph)_4.2$ diethyl ether, and $H^+B(C_{10}H_7)_4.2$ diethyl ether.

(3) Catalyst Component (C)

As the fine particle carrier that is a catalyst component (C), there may be mentioned an inorganic carrier, a particulate polymer carrier, or a mixture thereof. As the inorganic carrier, a metal, a metal oxide, a metal chloride, a metal carbonate, a carbonaceous material, or a mixture thereof can be used.

As suitable metals that can be used as the inorganic carriers, for example, iron, aluminum, nickel, and the like may be mentioned.

Further, as the metal oxide, either single oxides or composite oxides belonging to the group 1 to the group 14 elements of the periodic table can be mentioned and, for example, there can be exemplified natural or synthetic various single oxides or composite oxides such as $SiO_2$, $Al_2O_3$, MgO, CaO, $B_2O_3$, $TiO_2$, $ZrO_2$, $Fe_2O_3$, $Al_2O_3.MgO$, $Al_2O_3.CaO$, $Al_2O_3.SiO_2$, $Al_2O_3.MgO.CaO$, $Al_2O_3.MgO.SiO_2$, $Al_2O_3.CuO$, $Al_2O_3.Fe_2O_3$, $Al_2O_3.NiO$, $SiO_2.MgO$, and the like.

Here, the above formula is not a molecular formula and only represents the composition, and the structure and component ratio of the composite oxide to be used in the invention are not particularly limited.

The metal oxide to be used in the invention may be one that has absorbed a small amount of moisture and also may be one that contains a small amount of impurities As the metal chloride, for example, a chloride of an alkali metal or an alkaline earth metal is preferred, and specifically, $MgCl_2$, $CaCl_2$, and the like are especially preferred.

As the metal carbonate, a carbonate of an alkali metal or an alkaline earth metal is preferred, and specifically, magnesium carbonate, calcium carbonate, barium carbonate, and the like may be mentioned.

As the carbonaceous material, for example, carbon black, active carbon, and the like may be mentioned.

The above inorganic carriers can be all suitably used in the invention but particularly, the use of a metal oxide, silica, alumina, or the like is preferred.

These inorganic carriers are preferably used after fired at usually 200 to 800° C., preferably 400 to 600° C. in the air or an inert gas such as nitrogen or argon to regulate the amount of surface hydroxyl groups to 0.8 to 1.5 mmol/g.

The properties of the inorganic carriers are not particularly limited but, usually, it is preferable to use an inorganic carrier having an average particle size of 5 to 200 μm, preferably 10 to 150 μm, an average pore size of 20 to 1000 Å, preferably 50 to 500 Å, a specific surface area of 150 to 1000 m²/g, preferably 200 to 700 m²/g, a pore volume of 0.3 to 2.5 cm$^3$/g, preferably 0.5 to 2.0 cm$^3$/g, and an apparent specific gravity of 0.10 to 0.50 g/cm$^3$.

The above-described inorganic carrier can be, as a matter of course, used as it is but can be used after the carrier is brought into contact with an organoaluminum compound such as trimethylaluminum, triethylaluminum, triisobutylaluminum, trihexylaluminum, tripropylaluminum, tributylaluminum, trioctylaluminum, tridecylaluminum, or diisobutylaluminum hydride, or an organoaluminum oxy compound containing an Al—O—Al bond.

With regard to the metallocene catalyst according to the invention, at the time of obtaining the catalyst composed of the catalyst component (A), the catalyst component (B), and optionally the catalyst component (C), a method of bringing the components into contact with one another is not particularly limited and, for example, the following methods can be arbitrarily employed.

(I) After the catalyst component (A) and the catalyst component (B) are brought into contact with each other, the catalyst component (C) is brought into contact therewith.

(II) After the catalyst component (A) and the catalyst component (C) are brought into contact with each other, the catalyst component (B) is brought into contact therewith.

(III) After the catalyst component (B) and the catalyst component (C) are brought into contact with each other, the catalyst component (A) is brought into contact therewith.

Of these contact methods, (I) and (III) are preferred, and (I) is most preferred. In any contact methods, there is usually employed a method of bringing the components into contact with one another in an inert atmosphere such as nitrogen or argon, generally in the presence of a liquid inert hydrocarbon, e.g., an aromatic hydrocarbon such as benzene, toluene, xylene, or ethylbenzene (usually 6 to 12 carbon atoms) or an aliphatic or alicyclic hydrocarbon such as heptane, hexane, decane, dodecane, or cyclohexane (usually 5 to 12 carbon atoms), under stirring or without stirring.

This contact is preferably performed at a temperature of usually −100° C. to 200° C., preferably −50° C. to 100° C., further preferably 0° C. to 50° C., for 5 minutes to 50 hours, preferably 30 minutes to 24 hours, more preferably 30 minutes to 12 hours.

Further, at the time of the contact of the catalyst component (A), the catalyst component (B), and the catalyst component (C), as described above, there can be used both of an aromatic hydrocarbon solvent in which certain component(s) are soluble or sparingly soluble and an aliphatic or alicyclic hydrocarbon solvent in which certain component(s) are insoluble or sparingly soluble.

In the case of performing the contact reaction among the components stepwise, the solvent or the like used in the preceding step may be directly used as a solvent in the subsequent contact reaction without removing it. Further, after the preceding contact reaction using a soluble solvent, a liquid inert hydrocarbon (e.g., an aliphatic hydrocarbon, an alicyclic hydrocarbon, or an aromatic hydrocarbon such as pentane, hexane, decane, dodecane, cyclohexane, benzene, toluene, or xylene) in which certain component(s) are insoluble or sparingly soluble may be added thereto to recover a desired product as a solid matter or a part of or all of the soluble solvent is once removed by a means such as drying to take out the desired product, and thereafter, the subsequent contact reaction of the desired product may be carried out using any of the above-described inert hydrocarbon solvents. In the invention, the contact reaction of the components may be performed plural times.

In the invention, the use ratio of the catalyst component (A), the catalyst component (B), and the catalyst component (C) is not particularly limited, but is preferably in the following range.

In the case where an organoaluminum oxy compound is used as the catalyst component (B), the atomic ratio of aluminum in the organoaluminum oxy compound to the transition metal (M) in the catalyst component (A) (Al/M) is desirably in the range of usually 1 to 100,000, preferably 5 to 1000, more preferably 50 to 200 and, in the case where a borane compound or a borate compound is used, the atomic ratio of boron to the transition metal (M) in the metallocene compound (B/M) is desirably selected from the range of usually 0.01 to 100, preferably 0.1 to 50, more preferably 0.2 to 10.

Further, in the case where a mixture of an organoaluminum oxy compound and a borane compound or a borate compound is used as the catalyst component (B), for each compound in the mixture, it is desirable to select a use ratio the same as described above to the transition metal (M).

The amount of the catalyst component (C) to be used is 1 g, per 0.0001 to 5 mmol, preferably per 0.001 to 0.5 mmol, more preferably per 0.01 to 0.1 mmol of the transition metal in the catalyst component (A).

The catalyst component (A), the catalyst component (B), and the catalyst component (C) are brought into contact with one another by any of the contact methods (I) to (III), and thereafter, by removing the solvent, a catalyst for olefin polymerization can be obtained as a solid catalyst. The removal of the solvent is desirably performed under normal pressure or under reduced pressure, at 0 to 200° C., preferably at 20 to 150° C., for 1 minute to 50 hours, preferably for 10 minutes to 10 hours.

Incidentally, the metallocene catalyst can be also obtained by the following method.

(IV) The catalyst component (A) and the catalyst component (C) are brought into contact with each other and the solvent is removed to form a solid catalyst component, which is brought into contact with an organoaluminum oxy compound, a borane compound, a borate compound, or a mixture thereof under polymerization conditions.

(V) An organoaluminum oxy compound, a borane compound, a borate compound, or a mixture thereof is brought into contact with the catalyst component (C) and the solvent is removed to form a solid catalyst component, which is brought into contact with the catalyst component (A) under polymerization conditions.

Also in the case of the above contact methods (IV) and (V), as the component ratio, the contact conditions, and the solvent removal conditions, the same conditions as described above can be used.

Further, as a component serving as both of the catalyst component (B) and the catalyst component (C) that are essential components for the method of producing the polyethylene component (a) according to the invention, it is also possible to use a phyllosilicate.

The phyllosilicate is a silicate compound having a crystal structure in which planes configured by an ionic bond and the like are stacked in parallel with a weak bonding force.

Most phyllosilicates are naturally mainly produced as a main component of clay minerals, but these phyllosilicates are not particularly limited to naturally occurring ones and may be artificially synthesized ones.

Of these, smectite group, vermiculite group, and mica group such as montmorillonite, sauconite, beidellite, nontronite, saponite, hectorite, stevensite, bentonite, and taeniolite are preferable.

In general, natural products are often non-ion-exchangeable (non-swellable) and, in that case, in order to have a preferred ion exchangeability (or swellability), it is preferable to perform a treatment for imparting the ion exchangeability (or swellability). Among such treatments, particularly preferred include the following chemical treatments.

Here, as the chemical treatments, there can be used both of a surface treatment in which impurities attached to the surface are removed and a treatment which influences the crystal structure and/or chemical composition of the phyllosilicate.

Specifically, there may be mentioned (i) an acid treatment carried out using hydrochloric acid or sulfuric acid, (ii) an alkali treatment carried out using NaOH, KOH, $NH_3$, or the like, (iii) a salt treatment using a salt composed of a cation containing at least one atom selected from the group 2 to the group 14 of the periodic table and at least one anion selected from the group consisting of halogen atoms and inorganic acid-derived anions, (iv) a treatment with an organic substance such as an alcohol, a hydrocarbon compound, formamide, or aniline, and the like. These treatments may be carried out singly or in combination of two or more thereof.

As for the phyllosilicate, at any time before, during, or after any steps, the particle properties can be regulated by grinding, granulating, sizing, fractionating, or the like. The method may be any purposive one. In particular, as for the granulation method, for example, there may be mentioned a spray granulation method, a rolling granulation method, a compression granulation method, a stirring granulation method, a briquetting method, a compacting method, an extrusion granulation method, a fluidized bed granulation method, an emulsifying granulation method, an in-liquid granulation method, and the like. Among the above, particularly preferred granulation methods are a spray granulation method, a rolling granulation method, and a compression granulation method.

The phyllosilicate described above can be, as a matter of course, used as it is, but the phyllosilicate can be used in combination with an organoaluminum compound such as trimethylaluminum, triethylaluminum, triisobutylaluminum, tripropylaluminum, tributylaluminum, trihexylaluminum, trioctylaluminum, tridecylaluminum, or diisobutylaluminum hydride or an organoaluminum oxy compound containing an Al—O—Al bond.

In the metallocene catalyst according to the invention, for supporting the catalyst component (A) on the phyllosilicate, the catalyst component (A) and the phyllosilicate may be brought into contact with each other, or the catalyst component (A), the organoaluminum compound, and the phyllosilicate may be brought into contact with one another.

The contact method of the components is not particularly limited and, for example, the following method can be arbitrarily employed.

(VI) After the catalyst component (A) and the organoaluminum compound are brought into contact with each other, the resultant is brought into contact with the phyllosilicate carrier.

(VII) After the catalyst component (A) and the phyllosilicate carrier are brought into contact with each other, the resultant is brought into contact with the organoaluminum compound.

(VIII) After the organoaluminum compound and the phyllosilicate carrier are brought into contact with each other, the resultant is brought into contact with the catalyst component (A).

Of these contact methods, (VI) and (VIII) are preferred. Even in any contact methods, there is usually employed a method of bringing the components into contact with one another in an inert atmosphere such as nitrogen or argon, generally in the presence of a liquid inert hydrocarbon, e.g., an aromatic hydrocarbon such as benzene, toluene, xylene, or ethylbenzene (usually 6 to 12 carbon atoms) or an aliphatic or alicyclic hydrocarbon such as heptane, hexane, decane, dodecane, or cyclohexane (usually 5 to 12 carbon atoms), under stirring or without stirring.

The use ratio of the catalyst component (A), the organoaluminum compound, and the phyllosilicate carrier is not particularly limited, but is preferably in the following range.

The amount of the catalyst component (A) to be supported is 0.0001 to 5 mmol, preferably 0.001 to 0.5 mmol, and more preferably 0.01 to 0.1 mmol per 1 g of the phyllosilicate carrier.

Further, the amount of Al to be supported in the case of using the organoaluminum compound is desirably in the range of 0.01 to 100 mol, preferably 0.1 to 50 mol, more preferably 0.2 to 10 mol.

For the method of supporting and solvent removal, the same conditions as in the case of the inorganic carrier may be used.

When the phyllosilicate is used as a component serving as both of the catalyst component (B) and the catalyst component (C), the polymerization activity is high and the productivity of the ethylene-based polymer having long-chain branching is improved.

The thus obtained olefin polymerization catalyst may be used after a preliminary polymerization of monomers is performed as needed.

As a production example of the metallocene catalyst, for example, it can be produced with reference to the "Catalyst" and "Blending Ratio of Raw Materials and Conditions" described in JP-T-2002-535339 and JP-A-2004-189869 that are known publications. Furthermore, the index of the polymer can be regulated by various polymerization conditions and, for example, it can be regulated by the methods described in JP-A-2-269705 and JP-A-3-21607.

The polyethylene component (a) is obtained by homopolymerization of ethylene or copolymerization of ethylene with an α-olefin having 3 to 12 carbon atoms, for example, propylene, 1-butene, 1-pentene, 1-hexene, 4-methyl-1-pentene, 1-octene, or the like. Moreover, it is also possible to perform copolymerization with a diene in the case where modification is purposed. Examples of the diene compound to be used at this time include butadiene, 1,4-hexadiene, ethylidenenorbornene, dicyclopentadiene, and the like. Incidentally, the comonomer content at the polymerization can be selected arbitrarily but, for example, in the case of the copolymerization of ethylene with an α-olefin having 3 to 12 carbon atoms, the α-olefin content in the ethylene-α-olefin copolymer is 0 to 40% by mol, preferably 0 to 30% by mol.

The molecular weight of the produced polymer can be controlled to some extent by varying the polymerization conditions such as the polymerization temperature and the molar ratio of the catalyst, but the control of the molecular weight can be more effectively performed by the addition of hydrogen to the polymerization reaction system.

Further, even when a component for the purpose of water removal, a so-called scavenger, is added into the polymerization system, the polymerization can be carried out without any trouble.

As such a scavenger, there are used organoaluminum compounds such as trimethylaluminum, triethylaluminum, and triisobutylaluminum, the above-described organoaluminum oxy compounds, modified organoaluminum compounds containing a branched alkyl, organozinc compounds such as diethylzinc and dibutylzinc, organomagnesium compounds such as diethylmagnesium, dibutylmagnesium, and ethylbutylmagnesium, Grignard compounds such as ethylmagnesium chloride and butylmagnesium chloride. Of these, preferred are triethylaluminum, triisobutylaluminum, and ethylbutylmagnesium, and particularly preferred is triethylaluminum.

It can be also applied to a multistage polymerization method having two or more stages in which polymerization conditions such as hydrogen concentration, the amount of the monomer(s), polymerization pressure, and polymerization temperature are different from each other, without any problem.

The polyethylene component (a) can be produced by a production process such as a gas-phase polymerization method, a solution polymerization method, or a slurry polymerization method, and preferably, a slurry polymerization method is desirable. The polymerization temperature among the polymerization conditions for ethylene-based polymers can be selected from the range of 0 to 200° C. In the slurry polymerization, the polymerization is carried out at a temperature lower than the melting point of the product polymer. The polymerization pressure may be selected from the range of atmospheric pressure to about 10 MPa. The production can be performed by carrying out the slurry polymerization of ethylene and an α-olefin in the presence of an inert hydrocarbon solvent selected from aliphatic hydrocarbons such as hexane and heptane, aromatic hydrocarbons such as benzene, toluene, and xylene, alicyclic hydrocarbons such as cyclohexane and methylcyclohexane, in a state that oxygen, water and the like are substantially absent.

The polyethylene component (a) may be, as long as it satisfies a predetermined range, one obtained by sequential and continuous polymerization in a single polymerization vessel or a plurality of reactors connected in series or in parallel and may be one mixed after a plurality of ethylene polymers are separately polymerized.

3. Polyethylene Component (b)

The polyethylene for a pipe and a joint of the invention preferably contains a homopolymer of ethylene and/or a copolymer of ethylene and an α-olefin, i.e., an ethylene-based polymer as the polyethylene component (b) from the viewpoint of the pressure resistance and/or the durability.

In the invention, the polyethylene component (b) preferably has a melt flow rate (MFR) at a temperature of 190° C. and a load of 2.16 kg of 1 to 10 g/10 minutes and a density of 0.960 to 0.975 g/cm$^3$.

MFR of the polyethylene component (b) is 1 to 10 g/10 minutes, preferably, 1 to 8 g/10 minutes, and more preferably 1 to 5 g/10 minutes. When the MFR is less than 1 g/10 minutes, the molecular weight increases and the fluidity decreases, so that the moldability can not be secured. On the other hand, when the MFR exceeds 10 g/10 minutes, the impact resistance may decrease and/or SCG may lower.

Here, MFR is a value measured in accordance with JIS K6922-2:1997.

In the production of polyethylene, MFR can be controlled by ethylene polymerization temperature, the use of a chain transfer agent, and the like, and desired one can be obtained. That is, for example, by raising the temperature for polymerization of ethylene and an α-olefin, as a result of lowering the molecular weight, it is possible to increase MFR and, by lowering the polymerization temperature, as a result of increasing the molecular weight, MFR can be decreased. Further, in the copolymerization reaction of ethylene and an α-olefin, by increasing the amount of coexisting hydrogen (amount of the chain transfer agent), as a result of lowering the molecular weight, it is possible to increase MFR and, by reducing the amount of coexisting hydrogen (the amount of the chain transfer agent), as a result of increasing the molecular weight, MFR can be decreased.

The density of the polyethylene component (b) is 0.960 to 0.972 g/cm$^3$, preferably 0.961 to 0.970 g/cm$^3$, and more preferably 0.962 to 0.965 g/cm$^3$. When the density is less than 0.960 g/cm$^3$, in the final polyethylene, the pressure resistance may decrease. On the other hand, when the density exceeds 0.972 g/cm$^3$, the production of the polyethylene becomes difficult and, even when it can be produced, in the final polyethylene, the impact resistance may be significantly lowered.

The density is a value measured in accordance with JIS K6922-1,2:1997.

As for the density, desired one can be obtained by changing the type and amount of the comonomer to be copolymerized with ethylene, and the density can be reduced by increasing the content of the α-olefin.

The polyethylene component (b) of the invention preferably has the following composition.

That is, the polyethylene component (b) is preferably one composed of 18 to 30% by weight of a polyethylene component (b-1) and 70 to 82% by weight of a polyethylene component (b-2), and it is preferred that HLMFR of the polyethylene component (b-1) is 0.45 to 4.0 g/10 minutes, the density thereof is 0.935 to 0.955 g/cm$^3$, and MFR of the polyethylene component (b-2) is 50 to 200 g/10 minutes and the density thereof is 0.960 to 0.975 g/cm$^3$.

In the case where the polyethylene component (b-1) is less than 18% by weight and the polyethylene component (b-2) exceeds 82% by weight, the durability may decrease. In the case where the polyethylene component (b-1) exceeds 30% by weight and the polyethylene component (b-2) is less than 70% by weight, the pressure resistance in long-term use may be poor in the molded body.

HLMFR of the polyethylene component (b-1) is preferably 0.45 to 4.0 g/10 minutes, more preferably 0.5 to 2.0 g/10 minutes, and further preferably 0.5 to 1.0 g/10 minutes, the density of the polyethylene component (b-1) is preferably 0.935 to 0.955 g/cm$^3$ and more preferably 0.940 to 0.950 g/cm$^3$, and the ratio of the polyethylene component (b-1) is 18 to 30% by weight and more preferably 20 to 28% by weight.

HLMFR of the polyethylene component (b-1) can be measured by the same method as the aforementioned method of measuring HLMFR. When HLMFR is less than 0.45 g/10 minutes, compatibility with the polyethylene component (b-2) decreases and the impact resistance at the molded body tends to decrease. When HLMFR exceeds 4.0 g/10 minutes, there is a tendency that the impact resistance in the molded body decreases.

The control of HLMFR can be achieved either by varying the amount of the chain transfer agent (hydrogen or the like) that coexists during ethylene polymerization or by varying the polymerization temperature, and HLMFR can be increased by increasing the amount of hydrogen or by raising the polymerization temperature.

The density of the polyethylene component (b-1) can be measured by the same method as the aforementioned method of measuring the density. When the density is less than 0.935 g/cm$^3$, insufficient stiffness of the molded body becomes obvious, whereas, when it exceeds 0.955 g/cm$^3$, the durability and impact resistance at the molded body become insufficient.

The control of the density can be, for example, performed by varying the amount of the α-olefin to be copolymerized with ethylene, and an increase in the amount of the α-olefins can reduce the density.

MFR of the polyethylene component (b-2) is preferably 50 to 200 g/10 minutes and more preferably 70 to 150 g/10 minutes, the density of the polyethylene component (b-2) is preferably 0.960 to 0.975 g/cm$^3$ and more preferably 0.962 to 0.973 g/cm$^3$, and the ratio of the polyethylene component (b-2) is 70 to 82% by weight and more preferably 72 to 82% by weight.

MFR of the polyethylene component (b-2) can be measured by the same method as the aforementioned method of measuring HLMFR. When the MFR is less than 50 g/10 minutes, the fluidity at the time of molding becomes insufficient and there is a tendency that the molding becomes in an unstable state. When MFR exceeds 200 g/10 minutes, the impact resistance at the molded body tends to decrease.

The control of MFR can be achieved either by varying the amount of the chain transfer agent (hydrogen or the like) that coexists during ethylene polymerization or by varying the polymerization temperature, and MFR can be increased by increasing the amount of hydrogen or by raising the polymerization temperature.

The density of the polyethylene component (b-2) can be measured by the same method as the aforementioned method of measuring the density. When the density is less than 0.960 g/cm$^3$, insufficient stiffness of the molded body becomes obvious, whereas, when it exceeds 0.975 g/cm$^3$, the impact resistance becomes insufficient.

The control of the density can be, for example, performed by varying the amount of the α-olefin to be copolymerized with ethylene, and an increase in the amount of the α-olefins can reduce the density.

The polyethylene component (b) preferably has an Mw/Mn of 12 to 25, more preferably 15 to 21. When Mw/Mn is less than 12, the compatibility with the polyethylene component (a) decreases and the impact resistance of the final polyethylene composition may lower. On the other hand, when Mw/Mn exceeds 25, since the impact resistance of the polyethylene component (b) itself becomes low, the impact resistance of the final polyethylene composition may lower.

Mw/Mn is a value calculated from the weight-average molecular weight Mw and the number-average molecular weight Mn measured by GPC.

As for Mw/Mn, desired one can be, for example, obtained by varying the polymerization conditions such as the polymerization temperature of each component, or by varying each MFR of the polyethylene components (b-1) and (b-2) or varying the mixing ratio of the polyethylene components (b-1) and (b-2).

The polymerization catalyst for the polyethylene component (b) is not particularly limited but preferably, in view of the balance between MFR and the density, a Ziegler catalyst is used. Examples of preferred catalysts are solid Ziegler catalysts composed of a compound of Ti and/or V and an organometallic compound of an element belonging to the group 1 to 3 of the Periodic Table.

As a solid Ziegler catalyst, there may be mentioned solid catalysts containing titanium (Ti) and/or vanadium (V) and magnesium (Mg) and, as an organometallic compound which can be used together with these components, an organoaluminum compound, in particular, trialkylaluminum may be mentioned as preferred one. The amount of the organoaluminum compound to be used in the polymerization reaction is not particularly limited but, when used, is preferably in the range of 0.05 to 1000 mol relative to 1 mol of the transition metal compound.

The polyethylene component (b) in the invention can be produced, for example, by using the "Catalyst" described in Example 1 or the like of JP-A-63-202602 as an example of the Ziegler catalyst, with reference to "Blending Ratio of Raw Materials and Conditions" described in Example 1 and the like of JP-A-2004-123995 as a polymerization method.

The polyethylene component (b) is obtained by homopolymerization of ethylene or copolymerization of ethylene with an α-olefin having 3 to 12 carbon atoms, for example, propylene, 1-butene, 1-pentene, 1-hexene, 4-methyl-1-pentene, 1-octene, or the like. Moreover, it is also possible to perform copolymerization with a diene in the case where modification is purposed. Examples of the diene compound to be used at this time include butadiene, 1,4-hexadiene, ethylidenenorbornene, dicyclopentadiene, and the like.

Incidentally, the comonomer content at the polymerization can be selected arbitrarily but, for example, in the case of the copolymerization of ethylene with an α-olefin having 3 to 12 carbon atoms, the α-olefin content in the ethylene-α-olefin copolymer is 0 to 40% by mol, preferably 0 to 30% by mol.

The polyethylene component (b) can be produced by a production process such as a gas phase polymerization method, a solution polymerization method, or a slurry polymerization method, and preferably, a slurry polymerization method is desirable. The polymerization temperature among the polymerization conditions for the ethylene-based polymers can be selected from the range of 0 to 300° C. In the slurry polymerization, the polymerization is carried out at a temperature lower than the melting point of the product polymer. The polymerization pressure may be selected from the range of atmospheric pressure to about 10 MPa. The production can be performed by carrying out the slurry polymerization of ethylene and the α-olefin in the presence of an inert hydrocarbon solvent selected from aliphatic hydrocarbons such as hexane and heptane, aromatic hydrocarbons such as benzene, toluene, and xylene, alicyclic hydrocarbons such as cyclohexane and methylcyclohexane, and the like, in a state that oxygen, water, and the like are substantially absent.

The hydrogen fed to a polymerization reactor in the slurry polymerization is consumed as a chain transfer agent and determines the average molecular weight of the ethylene-based polymer to be formed, and a part of the hydrogen is dissolved in a solvent and discharged from the polymerization reactor. The solubility of hydrogen in the solvent is small, and the hydrogen concentration in the vicinity of the polymerization active sites of the catalyst is low unless a large amount of the gas phase portion is present in the polymerization reactor. Therefore, when the amount of the hydrogen to be fed is changed, the hydrogen concentration at the polymerization active site of the catalyst is rapidly changed and the molecular weight of the resulting ethylene polymer varies following the amount of the fed hydrogen in a short time. Accordingly, when the amount of the hydrogen to be fed is changed in a short period, it is possible to produce a more homogeneous product. For this reason, it is preferred to adopt a slurry polymerization method as a polymerization method. Further, as for the embodiment of changing the amount of the hydrogen to be fed, discontinuous change is more preferable than continuous change because an effect of broadening the molecular weight distribution is obtained.

In the polyethylene component (b) according to the invention, as described above, it is important to change the amount of the hydrogen to be fed but it is also important to change other polymerization conditions, for example, the polymerization temperature, the amount of the catalyst to be fed, the amount of olefin(s) such as ethylene to be fed, the amount of the comonomer such as 1-hexene to be fed, the amount of the solvent to be fed, and the like appropriately, simultaneously with the change in hydrogen or separately.

The Polyethylene component (b) can be constituted by a plurality of components. The polyethylene component (b) may be a polymer obtained by sequential and continuous polymerization in a multistage polymerization reactor using one kind of catalyst, may be a polymer produced in a single stage or multistage reactor using plural kinds of catalysts, or may be one obtained by mixing polymers polymerized using one kind or plural kinds of catalysts.

In the case of using a so-called multistage polymerization method in which polymerization is performed sequentially and continuously in a plurality of reactors connected in series, as long as it satisfies a predetermined range, the order may be either an order wherein polymerization is performed adopting production conditions for producing a high-molecular-weight component in an initial polymerization zone (first stage reactor), the resulting polymer is transferred into a subsequent reaction zone (second stage reactor), and a low-molecular-weight component is produced in the second stage reactor or conversely, an order wherein polymerization is performed adopting production conditions for producing a low-molecular-weight component in an initial polymerization zone (first stage reactor), the resulting polymer is transferred into a subsequent reaction zone (second stage reactor), and a high-molecular-weight component is produced in the second stage reactor.

A specific preferable polymerization method is the following method. That is, it is a method in which, using a Ziegler catalyst containing a titanium-based transition metal compound and an organoaluminum compound and two reactors, ethylene and an α-olefin are introduced into the first stage reactor to produce a polymer of a low-density high-molecular-weight component, the polymer withdrawn from the first stage reactor is transferred into the second stage reactor, and ethylene and hydrogen are introduced into the second stage reactor to produce a polymer of a high-density low-molecular-weight component.

In the case of the multistage polymerization, as for the amount and properties of the ethylene-based polymer formed in the polymerization zone of the second stage and thereafter, the amount of the polymer formed in each stage (able to be grasped by unreacted gas analysis or the like) is determined, the physical properties of the polymer withdrawn after each stage are measured, and thus the physical properties of the polymer formed in each stage can be determined based on the additivity.

Ethylene to be used in the polyethylene component (b) and the polyethylene component (a) may be ethylene produced from crude oil derived from a normal fossil material or may be ethylene derived from a plant. As ethylene and polyethylene derived from a plant, for example, ethylene and a polymer thereof described in JP-T-2010-511634 may be mentioned. The ethylene derived from a plant and a polymer thereof have a property of carbon-neutral (does not use any fossil materials and does not lead to an increase in carbon dioxide in the atmosphere) and it is possible to provide products that are friendly to the environment.

4. Compositional Ratios of Polyethylene Component (a) and Polyethylene Component (b)

The compositional ratio of the polyethylene component (a) is 25 to 35% by weight, relative to 75 to 65% by weight of the polyethylene component (b), preferably 26 to 35% by weight, relative to 74 to 65% by weight of the polyethylene component (b), and more preferably 27 to less than 35% by weight, relative to 73 to 65% by weight of the polyethylene component (b). When the compositional ratio of the polyethylene component (a) is less than 25% by weight, the long-term durability of the polyethylene of the invention, particularly SCG using FNCT as an index may decrease. On the other hand, when the ratio exceeds 35% by weight, MFR and the density of the polyethylene of the invention decreases, so that it may become a polymer having decreased fluidity, stiffness, and pressure resistance.

5. Molding Method of Polyethylene for Pipe and Joint

The above polyethylene for a pipe and a joint can be molded into a desired molded body by various molding machines after pelletized by mechanical melt-mixing by means of a pelletizer, homogenizer, or the like, according to a conventional method.

Further, the polyethylene for a pipe and a joint obtained by the above method may be blended with another olefin-based polymer, rubber, and the like and also known additives such as antioxidants, ultraviolet absorbers, light stabilizers, lubricants, antistatic agents, antifogging agents, anti-blocking agents, processing aids, coloring pigments, crosslinking agents, foaming agents, inorganic or organic fillers, and flame retardants, according to a conventional method.

As the additives, for example, one or more of antioxidants (phenol-based, phosphorus-based, sulfur-based), lubricants, antistatic agents, light stabilizers, ultraviolet absorbers, and the like may be appropriately used in combination. As the filler, it is possible to use calcium carbonate, talc, metal powders (aluminum, copper, iron, and lead), silica, diatomaceous earth, alumina, gypsum, mica, clay, asbestos, graphite, carbon black, titanium oxide, and the like and, of these, it is preferred to use calcium carbonate, talc, mica, and the like. In any cases, the polyethylene resin composition can be blended with various additives according to need and kneaded by a kneading extruder, a Banbury mixer, or the like to form a molding material.

In the present invention, in order to further accelerate the crystallization rate of the polyethylene for a pipe and a joint, it is also an effective method to use a nucleating agent.

As the nucleating agent, generally known ones can be used and common organic or inorganic nucleating agents can be used. For example, there may be mentioned dibenzylidene sorbitol or derivatives thereof, organic phosphoric acid compounds or metal salts thereof, aromatic sulfonic acid salts or metal salts thereof, organic carboxylic acids or metal salts thereof, rosin acid partial metal salts, inorganic fine particles such as talc, imides, amides, quinacridonequinones, or mixtures thereof.

Among them, dibenzylidene sorbitol derivatives, organic phosphoric acid metal salts, organic carboxylic acid metal salts, and the like are suitable, due to excellent transparency and the like.

Specific examples of the dibenzylidene sorbitol derivatives include 1,3:2,4-bis(o-3,4-dimethylbenzylidene) sorbitol, 1,3:2,4-bis(o-2,4-dimethylbenzylidene) sorbitol, 1,3:2,4-bis(o-4-ethylbenzylidene) sorbitol, 1,3:2,4-bis(o-4-chlorobenzylidene) sorbitol, and 1,3:2,4-dibenzylidene sorbitol, and specific examples of the benzoic acid metal salts include aluminum hydroxy-di(t-butyl benzoate) and the like.

In the case of blending the nucleating agent into the polyethylene of the invention, the amount of the nucleating agent to be blended is, relative to 100 parts by weight of the polyethylene, preferably 0.01 to 5 parts by weight, more preferably 0.01 to 3 parts by weight, further preferably 0.01 to 1 part by weight, and particularly preferably 0.01 to 0.5 part by weight. When the nucleating agent is less than 0.01 part by weight, an improving effect of high-speed moldability is not sufficient, while when it exceeds 5 parts by weight, there arises a problem that the nucleating agent tends to aggregate to form grains.

6. Molded Body

The polyethylene for a pipe and a joint of the invention as a raw material is molded mainly by an injection molding method, an extrusion molding method, or the like, and various molded bodies are obtained. As the molded bodies, for example, there may be mentioned pipes, joints of the pipes, and the like.

Since the polyethylene for a pipe and a joint of the invention satisfies the above properties, it is especially excellent in the pressure resistance, sufficiently meets the quality standards for pipes, for example, long-term resistance in a state that an internal pressure is applied and high resistance to SCG under stress concentration resulting from a notch shape, and has significantly improved performance as compared to conventional PE100 materials. Moreover, they can be produced with high productivity by realizing a high cycle of the molding cycle, so that there are obtained molded bodies that are excellent in the performance and also advantageous in costs.

Therefore, the molded body of the invention can be particularly suitably used as polyethylene pipes and joints for water distribution in need of such properties. In particular, since the molded body is very excellent in the pressure resistance and also excellent in the long-term durability, it is possible to thin the wall as before, so that it can be used particularly suitably as a thin-wall polyethylene pipe.

With regard to the molded body of the invention, the internal pressure for a test temperature of 23° C. and a use lifetime of 50 years as determined by the long-term hydrostatic mechanical strength (LTHS) measured in accordance with ISO 9080:2012 is preferably 12.5 MPa or more.

7. Use Applications

The polyethylene for a pipe and a joint of the invention is particularly suitable for use applications of pipes and joints.

For example, in the case of use applications of polyethylene pipes and joints for water distribution, according to the request of various specifications and the like, it is desired to use identical material as materials for the polyethylene pipes (pipes) and the joint. Because of the properties described above, the polyethylene for a pipe and a joint of the invention sufficiently meets the quality standards for pipes, for example, long-term durability in a state that an internal pressure is applied and high resistance to SCG under stress concentration resulting from a notch shape, has significantly improved performance as compared to conventional PE100 materials, and thus has the physical properties such as the durability necessary for pipes and joints, so that the polyethylene exhibits excellent productivity in both molding methods of injection molding and extrusion molding.

Specifically, in the injection molding, there are advantages that a high cycle is enabled, productivity is improved, post-shrinkage is difficult to occur even in thick products, and dimensional stability is good. Further, in the extrusion molding, there is an advantage that the resistance to the pipe surface flaws that may generate during molding is improved and thus the pipe surface appearance becomes good.

That is, the polyethylene for a pipe and a joint of the invention becomes polyethylene suitable for pipes and joints, which has both of high pressure resistance and economically effective points particularly in both of the injection molding and the extrusion molding.

Furthermore, since the molded body using the polyethylene for a pipe and a joint of the invention has a performance in the quality standards for pipes superior to the performance of conventional products, it is suitable as polyethylene-made pipes and joints.

Also, since the thin-wall polyethylene pipe of the invention uses the polyethylene for a pipe and a joint of the invention, thinning of the pipe thickness, weight reduction of the pipe, improvement in the service life, expansion of applicable places, and the like are possible.

EXAMPLES

The following will describe the present invention in more detail with reference to Examples, but the invention should not be construed as being limited to these Examples unless it exceeds the gist thereof.

1. Measurement Methods

Measurement methods used in Examples are as follows.
(1) Melt Flow Rate at a temperature of 190° C. at a load of 21.6 kg (HLMFR):

It was measured in accordance with JIS K6922-2:1997.
(2) Melt Flow Rate at a temperature of 190° C. at a load of 2.16 kg (MFR):

It was measured in accordance with JIS K6922-2:1997.
(3) Density:

It was measured in accordance with JIS K6922-1,2:1997.
(4) Measurement of Molecular Weight by Gel Permeation Chromatography (GPC) (weight-average molecular weight Mw):

It was measured by gel permeation chromatography (GPC) under the following conditions.

Apparatus: 150C manufactured by WATERS Co.
Columns: AD80M/S manufactured by Showa Denko K.K., three columns
Measurement temperature: 140° C.
Concentration: 1 mg/1 ml
Solvent: o-dichlorobenzene Incidentally, the calculation of the molecular weight and the calibration of the columns were carried out in accordance with the following methods.

GPC chromatogram data were incorporated into a computer at a frequency of 1 point/second, data processing was performed according to the description in Chapter 4 of "Size Exclusion Chromatography" written by Sadao Mori published by Kyoritsu Shuppan Co., Ltd. to calculate Mw values.

With regard to the calibration of the column, using a 0.2 mg/ml solution of each of monodisperse polystyrenes (S-7300, S-3900, S-1950, S-1460, S-1010, S-565, S-152, S-66.0, S-28.5, S-5.05) manufactured by Showa Denko K.K., n-eicosane, and n-tetracontane, a series of monodisperse polystyrenes were measured, the relationship between the elution peak time and logarithm of the molecular weight was fitted with a polynomial of degree four, and resulting one was used as a calibration curve.

The molecular weight of polystyrene (MPS) was converted into the molecular weight of polyethylene (MPE) using the following equation. $MPE = 0.468 \times MPS$
(5) Rupture Time in Full Notch Creep Test (measured at 80° C., 5 MPa.) (FNCT):

Measurement was performed at 80° C. and 5 MPa in accordance with the full-circumference notch-type tensile creep test of Annex 1 of JIS K6774 (1995). As a specimen, there was used one (test piece thickness: 6 mm, notch depth:

1 mm. full circumference) which was cut out from a compression molded sheet having a thickness of 6 mm and notched around full circumference, the sheet having been prepared under the conditions described in Table 2 of JIS K6922-2 (1997). As the test solution for immersing the samples, a 1% aqueous solution of sodium alkyl sulfate was used.

(6) Charpy Impact Strength (CIS) at −20° C.:

A specimen was prepared in accordance with JIS K6922-2 (1997) "Plastic-Polyethylene (PE) Molding and Extruding Materials - Part 2: Method for Preparing Specimen and Method for Determining Various Properties", and the strength was measured in accordance with JIS K7111 (1996) "Plastic-Test Method for Charpy Impact Strength".

(7) Rupture Time in Internal Pressure Creep Test (Measured at 20° C. and a Circumferential Stress of 13.0 MPa)

It is a value measured at 20° C. and a circumferential stress of 13.0 MPa in accordance with ISO1167 (2006). As a specimen, there is used a pipe having an outer diameter of 32 mm, a thickness of 3 mm, and a length of 350 mm. The test environment is underwater, and water is fed into the pipe and pressurized.

(8) Durability of Product:

Those whose FNCT exceeded 100 hours were rated as good "○", and those whose FNCT was 100 hours or less were rated as bad "x".

(9) Pressure Resistance of Product:

Those showing 500 hours or more in the internal pressure creep test were rated as good "○", and those showing less than 500 hours were rated as bad "x".

(10) Impact Resistance of Product:

Those in which the relationship between CIS and HLMFR satisfied the formula (1) and the relationship between CIS and the density (D) satisfied the formula (2) were rated as good "○", and those which did not conform to the formula (1) or did not conform to the formula (2) were rated as bad "x".

$$CIS > -0.1255 \times HLMFR + 11.216 \quad \text{Formula (1)}$$

$$CIS > -1375 \times D + 1323 \quad \text{Formula (2)}$$

(11) Overall Evaluation:

In the evaluations of the durability and the pressure resistance of the above products and the impact resistance of the above products, those that are evaluated as "○" in all the evaluations were rated as "○" and those any one was "x" were rated as "x".

2. Materials used in Example 1
(1) Polyethylene Component (a)
<Production of Metallocene Catalyst A>

Into a cylindrical flask equipped with an induction stirrer, which had been thoroughly purged with nitrogen, 3 g of silica having an average particle size of 11 μm (average particle size of 11 μm, surface area of 313 m$^2$/g, pore volume of 1.6 cm$^3$/g) was filled, and after 75 ml of toluene was added thereto, the whole was heated to 75° C. on an oil bath. Into another flask, 8.0 ml of a toluene solution of methylaluminoxane (manufactured by Albemarle Corp., 3.0 mol-Al/L) was collected. A toluene solution of dimethylsilylenebis[1,1'-{2-(2-(5-methyl)furyl)-4-(p-isopropylphenyl)-indenyl}]zirconium dichloride (63.4 mg, 75 μmol) (15 mL) was added to the toluene solution of methylaluminoxane at room temperature and, after the temperature was raised to 75° C., the mixture was stirred for 1 hour. Then, the toluene solution was added to the toluene slurry of silica heated at 75° C. while stirring, and the whole was maintained for 1 hour. Thereafter, 175 ml of n-hexane was added thereto at 23° C. while stirring and, after 10 minutes, the stirring was stopped and the mixture was allowed to stand. After the catalyst was thoroughly precipitated, the supernatant was removed and 200 ml of n-hexane was added. After the mixture was once stirred, it was again allowed to stand and the supernatant was removed. This operation was repeated three times to remove ingredients isolated into n-hexane. Furthermore, in a state of heating at 40° C., the solvent was distilled off under reduced pressure. After the degree of pressure reduction reached 0.8 mmHg or lower, drying under reduced pressure was further continued for 15 minutes to obtain a silica-supported metallocene catalyst A.

<Production of Fouling Preventive Component B>

In 100 mL of xylene, 3 g of n-octylated polyethyleneimine (one in which 0.5 piece of n-octyl group had been introduced per monomer unit of the polyethyleneimine) derived from polyethyleneimine (molecular weight of 10,000) and 1 g of phytic acid that is a phosphoric acid ester compound were mixed and stirred at room temperature to form a salt. Thereafter, 6 g of dioctylsulfosuccinic acid ester magnesium salt was mixed therein to obtain a fouling preventive component B.

<Production of Polyethylene Component (a)>

Into a loop-type slurry reactor having an internal volume of 290 L, 115 L/h of dehydrated and purified isobutane, 0.13 mol/h of triisobutylaluminum, and 6 ml/h of the fouling preventive component B were fed. The temperature in the reactor was made 80° C. and, while being intermittently discharged from the reactor so as to keep the pressure to 4.2 MPaG, ethylene, 1-hexene, and hydrogen were fed with controlling the molar ratio of 1-hexene to ethylene in the liquid during polymerization so as to be 0.019 and the molar ratio of hydrogen to ethylene so as to be $3.5 \times 10^{-4}$.

Then, the hexane slurry of the catalyst A, which had been diluted to 0.3 g/L with hexane, was fed in a rate of 3 L/h to initiate polymerization and ethylene was supplied so that the ethylene concentration in the reactor became 10 vol %. The resulting polyethylene was intermittently discharged together with isobutane and, after flashing, was sent to a product silo. As a result, the polyethylene was produced in a rate of 11 kg/h, HLMFR was 0.20 g/10 minutes, and the density was 0.922 g/cm$^3$.

(2) Polyethylene Component (b)

Using a Ziegler catalyst, the polymerization of ethylene and 1-hexene was carried out to produce a polyethylene component (b) having the properties described in Table 1. The properties of the polyethylene component (b) are shown in Table 1.

3. Examples and Comparative Examples

Example 1

<Production and Evaluation of Polyethylene for Pipe and Joint>

The polyethylene component (a) and the polyethylene component (b) described above were melted and mixed in the ratio shown in Table 1, thus producing a polyethylene for a pipe and a joint.

The physical properties and the evaluation results of the polyethylene for a pipe and a joint are shown in Table 1. The resulting polyethylene had excellent mechanical properties such as tensile yield stress, long-term durability, and impact resistance.

Examples 2 to 10

In accordance with Example 1, using the polyethylene components (a) and the polyethylene components (b) shown in Table 1, individual ones were melted and mixed in the ratios shown in Table 1, thus producing respective polyethylenes in the same manner as in Example 1. The evaluation results of the resulting polyethylenes are shown in Table 1.

Comparative Examples 1 to 9

Using the polyethylene components (a) and the polyethylene components (b) shown in Table 2, individual ones were melted and mixed in the ratios shown in Table 2, thus producing respective polyethylenes in the same manner as in Example 1. The evaluation results of the resulting polyethylenes are shown in Table 2.

In Comparative Examples 5 and 6, in addition to the polyethylene component (a) and the polyethylene component (b), the other component shown in Table 2 was melted and mixed in each ratio, thus producing each polyethylene in the same manner as in Example 1. The evaluation results of the resulting polyethylenes are shown in Table 2.

TABLE 1

| | | | | Example | | | | | | | | | |
|---|---|---|---|---|---|---|---|---|---|---|---|---|---|
| | | | | 1 | 2 | 3 | 4 | 5 | 6 | 7 | 8 | 9 | 10 |
| Polyethylene component (a) | Catalyst | | — | metallocene | metallocene | metallocene | metallocene | metallocene | metallocene | metallocene | metallocene | metallocene | metallocene |
| | HLMFR | | g/10 min | 0.20 | 0.20 | 0.20 | 0.30 | 0.30 | 0.20 | 0.20 | 0.20 | 0.20 | 0.20 |
| | Density | | g/cm$^3$ | 0.922 | 0.922 | 0.922 | 0.922 | 0.922 | 0.922 | 0.922 | 0.922 | 0.922 | 0.922 |
| | Comonomer | | — | 1-hexene | 1-hexene | 1-hexene | 1-hexene | 1-hexene | 1-hexene | 1-hexene | 1-hexene | 1-hexene | 1-hexene |
| | Blend ratio | | wt % | 27 | 28 | 30 | 30 | 28 | 27 | 30 | 27 | 30 | 30 |
| Polyethylene component (b) | Catalyst | | — | Ziegler | Ziegler | Ziegler | Ziegler | Ziegler | Ziegler | Ziegler | Ziegler | Ziegler | Ziegler |
| | b-1 | HLMFR | g/10 min | 0.85 | 0.80 | 0.53 | 0.82 | 0.54 | 0.54 | 4.0 | 4.0 | 3.7 | 3.5 |
| | | Density | g/cm$^3$ | 0.945 | 0.942 | 0.945 | 0.940 | 0.945 | 0.945 | 0.951 | 0.951 | 0.949 | 0.948 |
| | | Blend ratio | wt % | 25 | 25 | 20 | 25 | 20 | 20 | 25 | 25 | 25 | 25 |
| | b-2 | MFR | g/10 min | 150 | 80 | 120 | 100 | 140 | 140 | 130 | 130 | 120 | 130 |
| | | Density | g/cm$^3$ | 0.968 | 0.966 | 0.967 | 0.965 | 0.968 | 0.968 | 0.968 | 0.968 | 0.968 | 0.968 |
| | | Blend ratio | wt % | 75 | 75 | 80 | 75 | 80 | 80 | 75 | 75 | 75 | 75 |
| | MFR | | g/10 min | 3.6 | 2.5 | 4.6 | 2.5 | 5.2 | 5.2 | 9.1 | 9.1 | 7.0 | 6.5 |
| | Density | | g/cm$^3$ | 0.964 | 0.962 | 0.963 | 0.962 | 0.965 | 0.965 | 0.966 | 0.966 | 0.965 | 0.965 |
| | Mw/Mn | | — | 16.5 | 18.2 | 15.2 | 18.2 | 17.2 | 17.2 | 20.0 | 20.0 | 20.3 | 16.8 |
| | Blend ratio | | wt % | 73 | 72 | 70 | 70 | 73 | 73 | 70 | 73 | 70 | 70 |
| Other component | Catalyst | | — | — | — | — | — | — | — | — | — | — | — |
| | HLMFR | | g/10 min | — | — | — | — | — | — | — | — | — | — |
| | Density | | g/cm$^3$ | — | — | — | — | — | — | — | — | — | — |
| | Blend ratio | | wt % | — | — | — | — | — | — | — | — | — | — |
| Whole polyethylene | HLMFR | | g/10 min | 11 | 9 | 11 | 8 | 17 | 15 | 11 | 12 | 10 | 10 |
| | Density | | g/cm$^3$ | 0.956 | 0.955 | 0.954 | 0.954 | 0.955 | 0.957 | 0.956 | 0.957 | 0.955 | 0.955 |
| | Mw/Mn | | — | 21.6 | 22.0 | 23.5 | 23.1 | 23.0 | 21.8 | 25.6 | 25.1 | 26.6 | 24.7 |
| | FMCT (80° C., stress of 5 MPa) | | hr | 190 | 270 | 350 | 330 | 170 | 160 | 280 | 160 | 330 | 240 |
| | Internal pressure creep (20° C., circumferential stress of 13.0 MPa) | | hr | 800 | 650 | 550 | 550 | 600 | 1000 | 600 | 750 | 600 | 650 |
| | Sharpy impact strength (−20° C.) | | KJ/m$^2$ | 12 | 13 | 13 | 14 | 11 | 10 | 11 | 10 | 12 | 11 |
| | Right side value of formula (1) | | — | 9.8 | 10.1 | 9.8 | 10.2 | 9.1 | 9.3 | 9.8 | 9.7 | 10.0 | 10.0 |
| | Conformity to formula (1) | | — | conform | conform | conform | conform | conform | conform | conform | conform | conform | conform |
| | Right side value of formula (2) | | — | 8.5 | 9.9 | 11.3 | 11.3 | 9.9 | 7.1 | 8.5 | 7.1 | 9.9 | 9.9 |
| | Conformity to formula (2) | | — | conform | conform | conform | conform | conform | conform | conform | conform | conform | conform |
| Evaluation | Durability of product | | — | ◯ | ◯ | ◯ | ◯ | ◯ | ◯ | ◯ | ◯ | ◯ | ◯ |
| | Pressure resistance of product | | — | ◯ | ◯ | ◯ | ◯ | ◯ | ◯ | ◯ | ◯ | ◯ | ◯ |
| | Impact resistance of product | | — | ◯ | ◯ | ◯ | ◯ | ◯ | ◯ | ◯ | ◯ | ◯ | ◯ |
| | Overall evaluation | | — | ◯ | ◯ | ◯ | ◯ | ◯ | ◯ | ◯ | ◯ | ◯ | ◯ |

TABLE 2

| | | | | Comparative Example | | | | | | | | |
|---|---|---|---|---|---|---|---|---|---|---|---|---|
| | | | | 1 | 2 | 3 | 4 | 5 | 6 | 7 | 8 | 9 |
| Polyethylene component (a) | Catalyst | | — | metallocene | metallocene | metallocene | Ziegler | metallocene | metallocene | metallocene | metallocene | metallocene |
| | HLMFR | | g/10 min | 0.20 | 0.50 | 0.20 | 0.20 | 0.20 | 0.20 | 0.20 | 0.50 | 0.20 |
| | Density | | g/cm$^3$ | 0.922 | 0.930 | 0.922 | 0.922 | 0.922 | 0.922 | 0.922 | 0.925 | 0.922 |

TABLE 2-continued

|  |  |  | Comparative Example | | | | | | | | |
|---|---|---|---|---|---|---|---|---|---|---|---|
|  |  |  | 1 | 2 | 3 | 4 | 5 | 6 | 7 | 8 | 9 |
| Polyethylene component (b) | Comonomer | — | 1-hexene | 1-hexene | 1-hexene | 1-hexene | 1-hexene | 1-hexene | 1-hexene | 1-hexene | 1-hexene |
|  | Blend ratio | wt % | 30 | 30 | 26 | 30 | 33 | 33 | 25 | 26 | 27 |
|  | Catalyst | — | Ziegler | Ziegler | Ziegler | Ziegler | Ziegler | Ziegler | Ziegler | Ziegler | Ziegler |
|  | b-1 HLMFR | g/10 min | — | — | 0.80 | 0.80 | — | — | 0.42 | 0.42 | 9.2 |
|  | Density | g/cm³ | — | — | 0.942 | 0.942 | — | — | 0.940 | 0.940 | 0.952 |
|  | Blend ratio | wt % | — | — | 25 | 25 | — | — | 23 | 23 | 25 |
|  | b-2 MFR | g/10 min | — | — | 80 | 80 | — | — | 210 | 210 | 90 |
|  | Density | g/cm³ | — | — | 0.966 | 0.966 | — | — | 0.970 | 0.970 | 0.967 |
|  | Blend ratio | wt % | — | — | 75 | 75 | — | — | 77 | 77 | 75 |
|  | MFR | g/10 min | 20 | 20 | 2.5 | 2.5 | 100 | 100 | 3.2 | 3.2 | 13.6 |
|  | Density | g/cm³ | 0.965 | 0.965 | 0.962 | 0.962 | 0.970 | 0.970 | 0.964 | 0.964 | 0.967 |
|  | Mw/Mn | — | 9.8 | 9.8 | 18.2 | 18.2 | 7.4 | 7.4 | 27.2 | 27.2 | 14.3 |
|  | Blend ratio | wt % | 70 | 70 | 74 | 70 | 57 | 53 | 75 | 74 | 73 |
| Other component | Catalyst | — | — | — | — | — | chromium | chromium | — | — | — |
|  | HLMFR | g/10 min | — | — | — | — | 3.8 | 3.8 | — | — | — |
|  | Density | g/cm³ | — | — | — | — | 0.961 | 0.961 | — | — | — |
|  | Blend ratio | wt % | — | — | — | — | 10 | 14 | — | — | — |
| Whole polyethylene | HLMFR | g/10 min | 30 | 45 | 13 | 13 | 13 | 9 | 24 | 27 | 16.4 |
|  | Density | g/cm³ | 0.955 | 0.957 | 0.955 | 0.953 | 0.955 | 0.954 | 0.957 | 0.956 | 0.956 |
|  | Mw/Mn | — | 12.9 | 11.5 | 20.6 | 28.6 | 18.2 | 17.1 | 24.2 | 21.5 | 20.7 |
|  | FMCT (80° C., stress of 5 MPa) | hr | 30 | 10 | 100 | 50 | 380 | 410 | 70 | 30 | 50 |
|  | Internal pressure creep (20° C., circumferential stress of 13.0 MPa) | hr | 600 | 1000 | 400 | 50 | 550 | 300 | 1100 | 700 | 700 |
|  | Sharpy impact strength (−20° C.) | KJ/m² | 5 | 4 | 9 | 16 | 7 | 8 | 8 | 8 | 6 |
|  | Right side value of formula (1) | — | — | 7.5 | 5.6 | 9.6 | 9.6 | 9.6 | 10.1 | 8.2 | 7.8 | 9.2 |
|  | Conformity to formula (1) | — | not conform | not conform | not conform | conform | not conform | not conform | not conform | conform | not conform |
|  | Right side value of formula (2) | — | 9.9 | 7.1 | 9.9 | 12.6 | 9.9 | 11.3 | 7.1 | 8.5 | 8.5 |
|  | Conformity to formula (2) | — | not conform | not conform | not conform | conform | not conform | not conform | conform | not conform | not conform |
| Evaluation | Durability of product | — | X | X | X | X | ○ | ○ | X | X | X |
|  | Pressure resistance of product | — | ○ | ○ | X | X | ○ | X | ○ | ○ | ○ |
|  | Impact resistance of product | — | X | X | X | ○ | X | X | X | X | X |
|  | Overall evaluation | — | X | X | X | X | X | X | X | X | X |

[Evaluation]

As described above, from the results shown in Table 1 and Table 2, when Examples 1 to 10 are compared to Comparative Examples 1 to 9, polyethylenes (Examples 1 to 10) satisfying the specific requirements of the polyethylene for a pipe and a joint of the present invention were excellent in the durability and the impact resistance in the molded bodies.

In contrast, in Comparative Example 1, since the dispersion of the polyethylene component (a) of the polyethylene for a pipe and a joint was poor, HLMFR was large and the durability and impact resistance of the molded body were low.

In Comparative Example 2, HLMFR of the polyethylene for a pipe and a joint was large and the durability and impact resistance of the molded body were low.

In Comparative Examples 3 and 4, FNCT was low, so that the durability as the molded bodies was inferior.

In Comparative Examples 5 and 6, since the Charpy impact strength was low, the impact resistance as the molded body was poor.

In Comparative Examples 7 and 8, HLMFR was large, so that the durability and the impact resistance as the molded bodies were poor.

In Comparative Example 9, since FNCT was low and the Charpy impact strength was low, the durability and the impact resistance as the molded bodies were poor.

While the invention has been described in detail and with reference to specific embodiments thereof, it will be apparent to one skilled in the art that various changes and modifications can be made therein without departing from the spirit and scope thereof.

The present application is based on Japanese Patent Application No. 2015-072626 filed on Mar. 31, 2015, and the contents are incorporated herein by reference.

INDUSTRIAL APPLICABILITY

According to the present invention, it is possible to provide a polyethylene for a pipe and a joint, which is suitable for gas pipes, water distribution pipes, and joints thereof and particularly, is suitable for polyethylene pipes for water distribution and joints thereof, sufficiently meets the quality standards for pipes, for example, long-term resistance in a state that an internal pressure is applied, high resistance to SCG under stress concentration resulting from a notch shape or the like, has significantly improved performance as compared to conventional PE100 materials, also has high fluidity, and is capable of being molded in both methods of an injection molding method and an extrusion molding method.

That is, a molded body using the polyethylene for a pipe and a joint of the present invention is a molded body having a performance that sufficiently meets the quality standards for pipes and also having high durability, further excellent impact resistance, and good pipe surface appearance, and is advantageous in the productivity and costs, so that the molded body is industrially highly useful.

The invention claimed is:

1. A polyethylene, which satisfies the following characteristics (1) to (5):
    Characteristic (1): a melt flow rate at a temperature of 190° C. and a load of 21.6 kg (HLMFR) is 5 to 20 g/10 minutes,
    Characteristic (2): a density (D) is 0.954 to 0.960 g/cm$^3$,
    Characteristic (3): a ratio of weight-average molecular weight (Mw) and number-average molecular weight (Mn) (Mw/Mn) measured by gel permeation chromatography (GPC) is 15 to 27,
    Characteristic (4): a rupture time at 80° C. and 5 MPa by a full notch creep test (FNCT) is 150 hours or more, and
    Characteristic (5): a Charpy impact strength (CIS) measured at −20° C. is 8.5 kJ/m$^2$ or more,
    wherein the polyethylene contains at least 25 to 35% by weight of the following polyethylene component (a) and 75 to 65% by weight of the polyethylene component (b):
    the polyethylene component (a) being a polyethylene which is polymerized using a metallocene catalyst, has an HLMFR of 0.01 to 0.5 g/10 minutes, and has a density of 0.915 to 0.930 g/cm$^3$ and
    the polyethylene component (b) being a polyethylene which is at least one of an ethylene homopolymer and a copolymer of ethylene and an α-olefin, has a melt flow rate (MFR) at a temperature of 190° C. and a load of 2.16 kg of 1 to 10 g/10 minutes, a density of 0.960 to 0.975 g/cm$^3$, and an Mw/Mn of 12 to 25, and
    wherein the polyethylene component (b) is composed of 18 to 30% by weight of a polyethylene component (b-1) and 70 to 82% by weight of a polyethylene component (b-2), the polyethylene component (b-1) has an HLMFR of 0.45 to 4.0 g/10 minutes and a density of 0.935 to 0.955 g/cm$^3$, and the polyethylene component (b-2) has an MFR of 50 to 200 g/10 minutes and a density of 0.960 to 0.975 g/cm$^3$.

2. The polyethylene according to claim 1, which further satisfies the following characteristic (6):
    Characteristic (6): a relationship between the CIS and the HLMFR satisfies the following formula (1):

CIS>−0.1255×HLMFR+11.216        Formula (1).

3. The polyethylene according to claim 1, which further satisfies the following characteristic (7):
    Characteristic (7): a relationship between the CIS and the density (D) satisfies the following formula (2):

CIS>−1375×D+1323        Formula (2).

4. The polyethylene according to claim 1, wherein the polyethylene component (b) is an ethylene-based polymer polymerized using a Ziegler catalyst.

5. The polyethylene according to claim 1, wherein the polyethylene component (a) is polymerized using a metallocene catalyst having a cyclopentadienyl ring and a heterocyclic aromatic group.

6. The polyethylene according to claim 1, wherein the polyethylene component (b) is polymerized using a metallocene catalyst having a cyclopentadienyl ring and a fluorenyl ring.

7. A molded body formed from the polyethylene according to claim 1.

8. The molded body according to claim 7, wherein the molded body is a pipe or a joint.

9. The molded body according to claim 8, wherein a breaking time at 20° C. and at a circumferential stress of 13.0 MPa by an internal pressure creep test is 500 hours or more.

10. The molded body according to claim 9, wherein an internal pressure at a test temperature of 23° C. and for a use lifetime of 50 years determined by long-term hydrostatic strength (LTHS) measured in accordance with ISO 9080: 2012 is 12.5 MPa or more.

* * * * *